US008524846B1

(12) United States Patent
Mason

(10) Patent No.: US 8,524,846 B1
(45) Date of Patent: Sep. 3, 2013

(54) TRIANIONIC LIGAND PRECURSOR COMPOUNDS AND USES THEREOF IN CONSTRAINED GEOMETRY CATALYSTS

(75) Inventor: Mark R. Mason, Toledo, OH (US)

(73) Assignee: The University of Toledo, Toledo, OH (US)

( * ) Notice: Subject to any disclaimer, the term of this patent is extended or adjusted under 35 U.S.C. 154(b) by 418 days.

(21) Appl. No.: 12/829,509

(22) Filed: Jul. 2, 2010

Related U.S. Application Data

(60) Provisional application No. 61/222,739, filed on Jul. 2, 2009.

(51) Int. Cl.
*C08F 4/68* (2006.01)
*C08F 4/64* (2006.01)
*C08F 4/76* (2006.01)

(52) U.S. Cl.
USPC ........... 526/172; 526/169; 526/160; 526/161; 526/170; 502/103; 556/42; 556/51; 556/57

(58) Field of Classification Search
USPC .............................. 556/51; 526/172, 161, 169
See application file for complete search history.

(56) References Cited

U.S. PATENT DOCUMENTS

| | | | |
|---|---|---|---|
| 6,232,260 B1 | 5/2001 | Nagy et al. | |
| 6,703,338 B2 | 3/2004 | Holtcamp et al. | |
| 6,734,266 B2 | 5/2004 | Gao et al. | |
| 6,767,975 B1 | 7/2004 | Liu | |
| 6,841,504 B2 | 1/2005 | Holtcamp | |
| 6,858,689 B2 | 2/2005 | Holtcamp et al. | |
| 6,930,070 B2 | 8/2005 | Holtcamp et al. | |
| 6,989,341 B2 | 1/2006 | Holtcamp et al. | |
| 6,998,451 B2 | 2/2006 | Nagy et al. | |
| 7,001,962 B2 | 2/2006 | Gao et al. | |
| 7,053,158 B2 | 5/2006 | Zhu | |
| 7,273,914 B2 | 9/2007 | Wang et al. | |
| 7,399,874 B2 * | 7/2008 | Kuchta et al. ................. | 556/137 |
| 2003/0171211 A1 | 9/2003 | Holtcamp | |
| 2004/0005983 A1 | 1/2004 | Holtcamp et al. | |
| 2004/0106514 A1 | 6/2004 | Nagy et al. | |
| 2004/0127348 A1 | 7/2004 | Holtcamp et al. | |
| 2004/0167016 A1 | 8/2004 | Holtcamp et al. | |
| 2005/0075242 A1 | 4/2005 | Holtcamp et al. | |
| 2005/0085602 A1 | 4/2005 | Nagy et al. | |
| 2005/0261449 A1 | 11/2005 | Voskoboynikov et al. | |
| 2009/0062487 A1 | 3/2009 | Nagy et al. | |

(Continued)

FOREIGN PATENT DOCUMENTS

WO 2004003031 A2 1/2004
WO 2004050718 A1 6/2004

(Continued)

OTHER PUBLICATIONS

Seo et al., J. Organomet. Chem., 2001, 640, 79-84.*

(Continued)

*Primary Examiner* — Rip A. Lee
(74) *Attorney, Agent, or Firm* — MacMillan, Sobanski & Todd, LLC

(57) ABSTRACT

Trianionic ligand precursor compounds, catalyst systems containing the precursor compounds, and uses of the precursor compounds are described. The present invention also provides constrained geometry catalysts, methods to make the constrained geometry catalysts and methods to use the constrained geometry catalysts in various reaction systems, including polymerization, metathesis reactions, and hydroamination reactions.

59 Claims, 8 Drawing Sheets

(56) References Cited

U.S. PATENT DOCUMENTS

| | | |
|---|---|---|
| 2009/0062488 A1 | 3/2009 | Nagy et al. |
| 2009/0062490 A1 | 3/2009 | Nagy et al. |
| 2009/0124486 A1 | 5/2009 | Holtcamp et al. |
| 2009/0156391 A1 | 6/2009 | Liguori et al. |

FOREIGN PATENT DOCUMENTS

| | | |
|---|---|---|
| WO | 2005040237 A1 | 5/2005 |
| WO | 2005105864 A1 | 11/2005 |
| WO | 2007065816 A2 | 6/2007 |
| WO | 2009032048 A1 | 3/2009 |
| WO | 2009032049 A1 | 3/2009 |
| WO | 2009032051 A1 | 3/2009 |

OTHER PUBLICATIONS

Braunschweig, H. et al., "Constrained Geometry Complexes—Synthesis and Applications," Coordination Chemistry Reviews, 2006, pp. 2691-2720, vol. 250.

Cano, J. et al., "A New Type of Doubly Silylamido-Bridged Cyclopentadienyl Group 4 Metal Complexes," Angew. Chem. Int. Ed., 2001, pp. 2495-2497, vol. 40, No. 13.

Cano, J. et al., "How to Synthesize a Constrained Geometry Catalyst (CGC)—A Survey," Journal of Organometallic Chemistry, 2007, pp. 4411-4423, vol. 692.

Cano, J. et al., "Insertion Reactions into the Metal-Alkyl and Metal-Amido Bonds of 1,3-Di(silyl-η-amido) cyclopentadienyl Titanium and Zirconium Complexes," Organometallics, 2005, pp. 2424-2432, vol. 24.

Mason, M.R. et al., "Di- and Triindolylmethanes: Molecular Structures and Spectroscopic Characterization of Potentially Bidentate and Tridentate Ligands," Journal of Chemical Crystallography, Jul. 2003, pp. 531-540, vol. 33, No. 7.

Padmanabhan, S et al., "Synthesis and Structure of Titanatranes Containing Tetradentate Trianionic Donor Ligands of the Type [(O-2,4-$R_2C_6H_2$-6-$CH_2$)2($OCH_2CH_2$)]$N^{3-}$- and Their Use in Catalysis for Ethylene Polymerization," Oranometallics, 2007, pp. 1616-1626, vol. 26.

Seo, W.S. et al., "Synthesis and Structure of Ansa-Cyclopentadienyl Pyrrolyl Titanium Complexes: [($\eta 5$-$C_5H_4$)$CH_2$(2-$C_4H_3N$)]Ti($NMe_2$)2 and [1,3-($CH_2$(2-$C_4H_3N$)}2 ($\eta 5$-$C_5H_3$)]Ti($NMe_2$)," Journal of Organometallic Chemistry, 2001, pp. 79-84, vol. 640.

Sudhakar, P., "Appreciable Norbornene Incorporation in the Copolymerization of Ethylene/Norbornene Using Titanium Catalysts Containing Trianionic N[$CH_2CH$(Ph)O]$3^{3-}$-Ligands," Journal of Polymer Science: Part A: Polymer Chemistry, 2008, pp. 444-452, vol. 46.

Zhang, Z.-H. et al., "An Efficient and Practical Process for the Synthesis of Bis(indolyl)methanes Catalyzed by Zirconium Tetrachloride," Synthesis, 2005, pp. 1949-1954, No. 12.

* cited by examiner

1

2

3

4

1b

2b

3b

4b

5b

6b

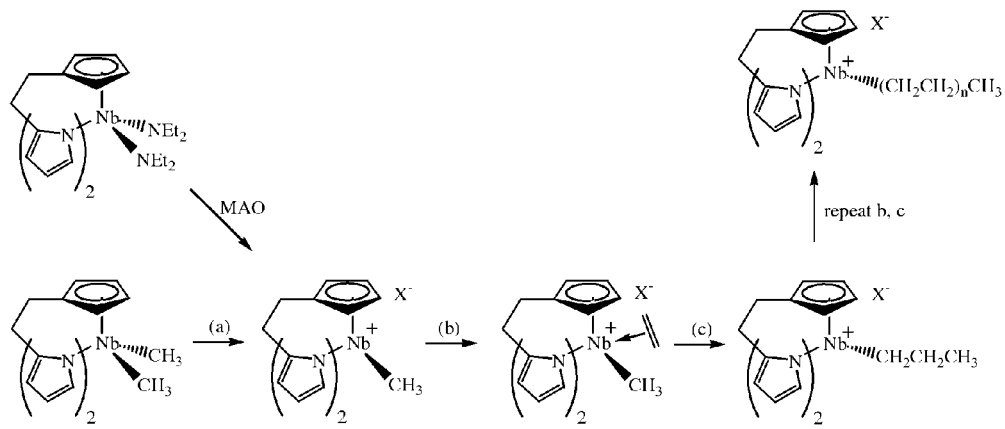
Figure 5 - Scheme I
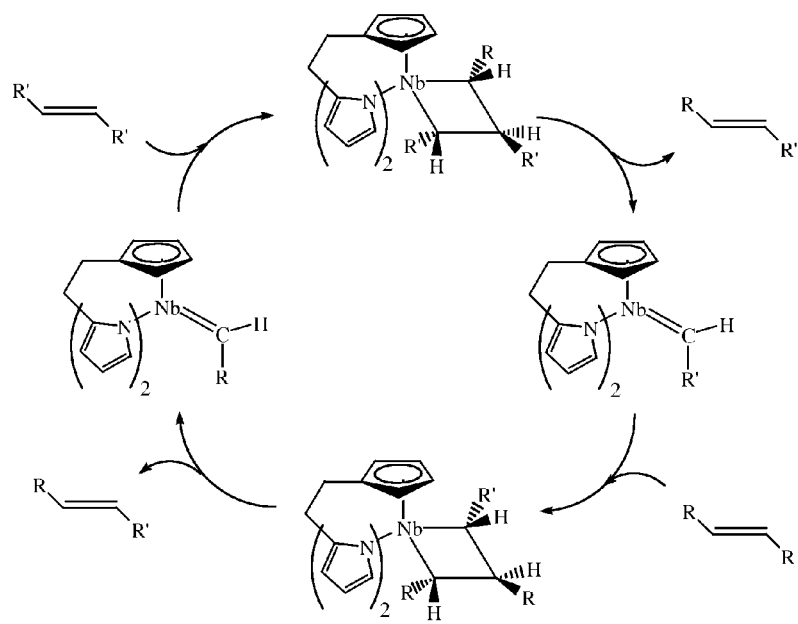
Figure 6 - Scheme II
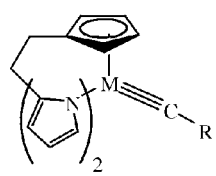
Alkylidyne complexes
M = Mo, W
Figure 7

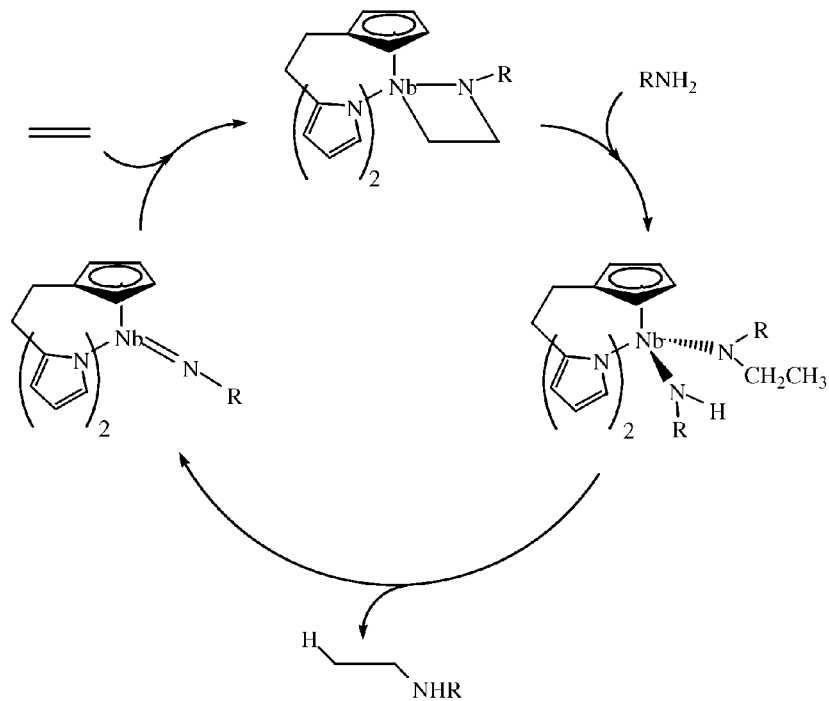
Figure 8 - Scheme III
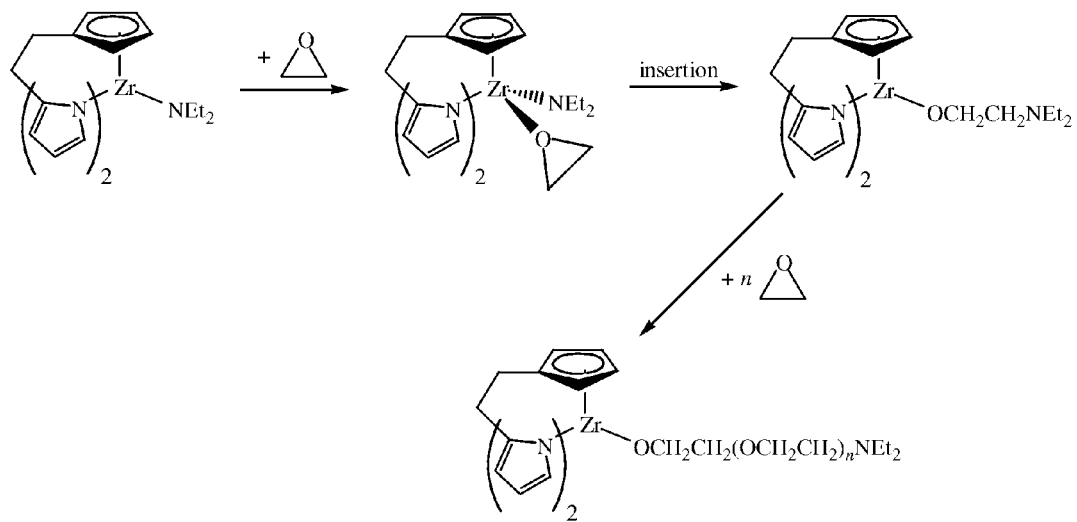
Figure 9 - Scheme IV

TRIANIONIC LIGAND PRECURSOR COMPOUNDS AND USES THEREOF IN CONSTRAINED GEOMETRY CATALYSTS

CROSS-REFERENCE TO RELATED APPLICATIONS AND STATEMENT REGARDING SPONSORED RESEARCH

The present invention claims the benefit of U.S. provisional patent application Ser. No. 61/222,739, filed Jul. 2, 2009.

This invention was made with no Government support and the Government has no rights in this invention.

FIELD OF INVENTION

In a broad aspect, the present invention relates to trianionic ligand precursor compounds. In another aspect, the trianionic ligand precursor compounds are useful for making constrained geometry catalysts (CGC). In one embodiment, the CGC is comprised of a trianionic ligand precursor compound having at least one of a cyclopentadienyl, fluorenyl or indenyl moiety bridged to at least one of a dipyrrolylmethane or diindolylmethane group, where the trianionic ligand precursor compound is coordinated to a metal or metal complex.

BACKGROUND OF THE INVENTION

There is no admission that the background art disclosed in this section legally constitutes prior art.

Over the past twenty years, homogeneous and heterogeneous catalysts comprised of single-site molecular complexes (typically of titanium, zirconium, or other early transition metals, as well as nickel, palladium, and platinum) have replaced traditional Ziegler-Natta catalysts for the polymerization of alkenes. Unlike conventional catalysts, these new catalysts allow precise and previously unprecedented control over polymer properties, including tacticity and molecular weight. The organic compounds (ligands) that bind to the metal are highly desirable for tailoring the activity and selectivity of the resulting catalysts. Thus, new ligands for single-site catalysts are of considerable commercial interest for a variety of applications.

One particular class of ligands is that which favors formation of constrained geometry catalysts (CGCs). These ligands are typically comprised of a cyclopentadienyl moiety with one or more substituents capable of binding to a metal. These ligands are typically monoanionic or dianionic. What is needed is a class of previously unknown ligands with potential applications for CGCs for metathesis reactions, hydroamination of alkenes, and oligomerization and polymerization of alkenes, epoxides, cyclic ethers, lactones, and other monomers. These objectives and others are met by the present invention.

SUMMARY OF THE INVENTION

The present invention provides compounds of the Formula A

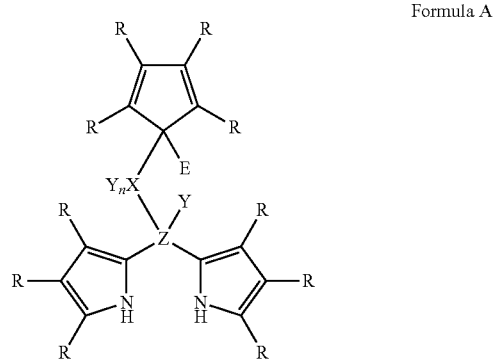

Formula A and stereoisomers, solvates and hydrates thereof, wherein

R is selected from the group consisting of hydrogen, halogen, alkyl, alkenyl, alkynyl, cycloalkyl, cycloalkenyl, substituted alkyl, substituted alkenyl, substituted alkynyl, substituted cycloalkyl, substituted cycloalkenyl, aryl, heteroaryl silyl, heterosilyl, and heterocyclic; or R is combined with at least one other R to form one or two $C_3$, $C_4$, $C_5$ or $C_6$ aliphatic or aromatic fused ring or rings, wherein when two fused rings are present, the number of carbons in each ring may be the same or different from each other;

X is an element selected from the group consisting of: a Group 13 element, a Group 14 element; a Group 15 element; or a Group 16 element; wherein n=0, 1, 2;

Y is selected from the group consisting of hydrogen, halogen, alkyl, alkenyl, alkynyl, cycloalkyl, cycloalkenyl, substituted alkyl, substituted alkenyl, substituted alkynyl, substituted cycloalkyl, substituted cycloalkenyl, aryl, heteroaryl silyl, heterosilyl, and heterocyclic;

Z is selected from the group consisting of a Group 13 element; a Group 14 element; a Group 15 element; or a Group 16 element;

E is selected from the group consisting of H, D, halogen, or substituted silicon.

Particularly provided are those compounds as described above, wherein X and Z are selected from the group consisting of: carbon, silicon, phosphorous, germanium, or tin. Also particularly provided are those compounds as described above, wherein R is selected from the group consisting of H; or R is combined with at least one other R to form one or two $C_3$, $C_4$, $C_5$ or $C_6$ aliphatic or aromatic fused ring or rings, wherein when two fused rings are present, the number of carbons in each ring may be the same or different from each other; X and Z are selected from the group consisting of carbon or silicon; Y and E are H. Particularly provided are those compounds as described above, wherein the compound is comprised of at least one of: a cyclopentadienyl ring, a fluorenyl ring, or an indenyl ring bridged to at least one of a dipyrrolyl group or diindolyl group. More particularly provided are those compounds as described above, wherein one or more of the cyclopentadienyl ring, the fluorenyl ring, the indenyl ring, the dipyrrolyl group and the diindolyl group are substituted, and/or those having a pendant group containing two pyrrolyl or indolyl donors, the trianionic ligand precursor compound being a trianion upon deprotonation and coordination to a metal.

Also provided are those compounds as described above which comprise i) an $\eta^5$ coordination one or more of: a cyclopentadienyl ring, an indenyl ring and a fluorenyl ring; and ii) an $\eta^1$ coordination of each of at least two pyrrolyl or indolyl groups, wherein the pyrrolyl or indolyl groups are configured so as to be capable, upon deprotonation, of being coordinated to a metal or a metal complex. Particularly, those compounds wherein the steric environment around the metal or the metal complex affects catalyst activity and/or selectivity are provided, although also provided are such compounds, wherein coordination of the pyrrolyl or indolyl groups results in the formation of a six-membered chelate ring; the presence of the six-membered chelate ring in addition to the $\eta^5$ (eta-5) coordination of the cyclopentadienyl ring, indenyl ring, or fluorenyl ring providing a constrained geometry ligand.

In particular embodiments, the present invention provides compounds comprising the Formula B through G (shown below), and stereoisomers, solvates and hydrates thereof, wherein R is selected from the group consisting of hydrogen, alkyl, aryl or heterocycle; E is selected from the group consisting of hydrogen, D or SiMe$_3$:

Formula B

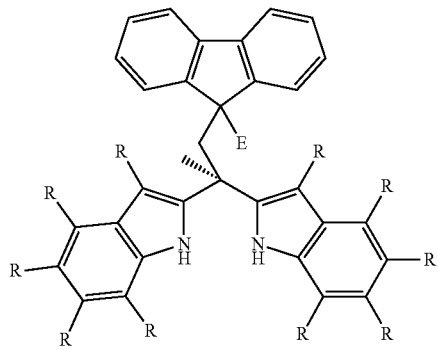

Formula C

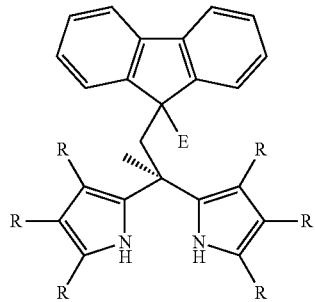

Formula D

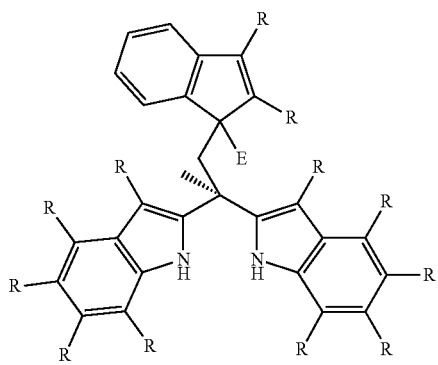

Formula E

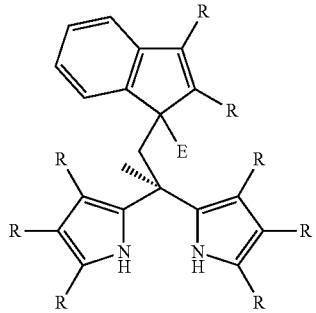

Formula F

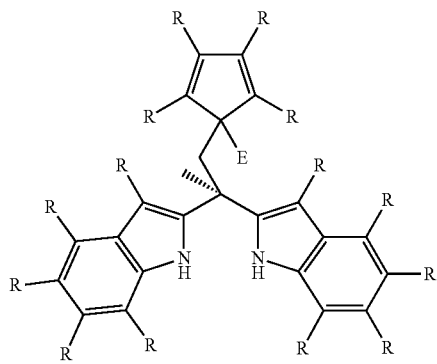

Formula G

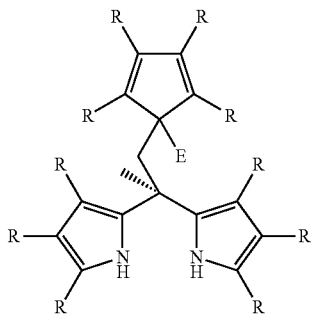

In other embodiments, there are provided compounds of the Formula H through N (shown below), and stereoisomers, solvates and hydrates thereof, wherein R is selected from the group consisting of hydrogen, alkyl, aryl or heterocycle; Z is selected from the group consisting of a Group 13, 14 or 15 element; E is selected from the group consisting of hydrogen, D or SiMe$_3$:

Particularly provided are those compounds as described above, wherein Z is selected from the group consisting of carbon and silicon; and E is hydrogen.

In other embodiments, there are provided compounds selected from the group consisting of Formula 1-4

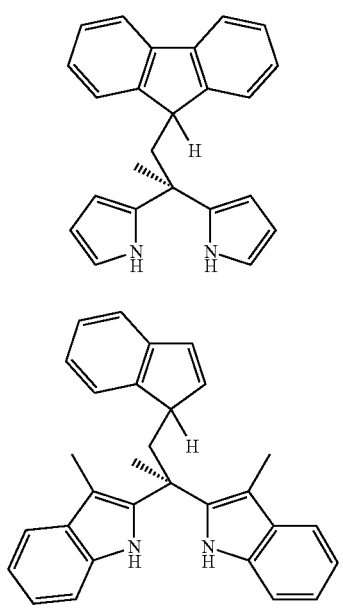
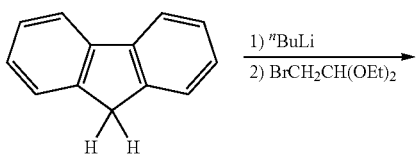
Also provided are methods for making a trianionic ligand precursor compound, comprising a synthetic route as shown in FIG. 2:
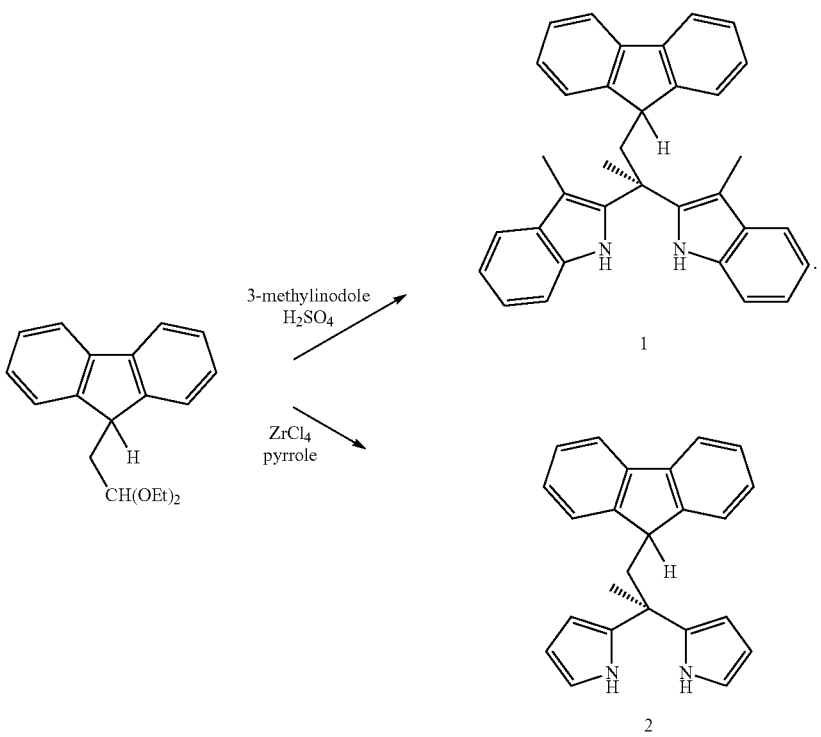

Also provided are methods for making a trianionic ligand precursor compound, comprising a synthetic route as shown in FIG. 3:

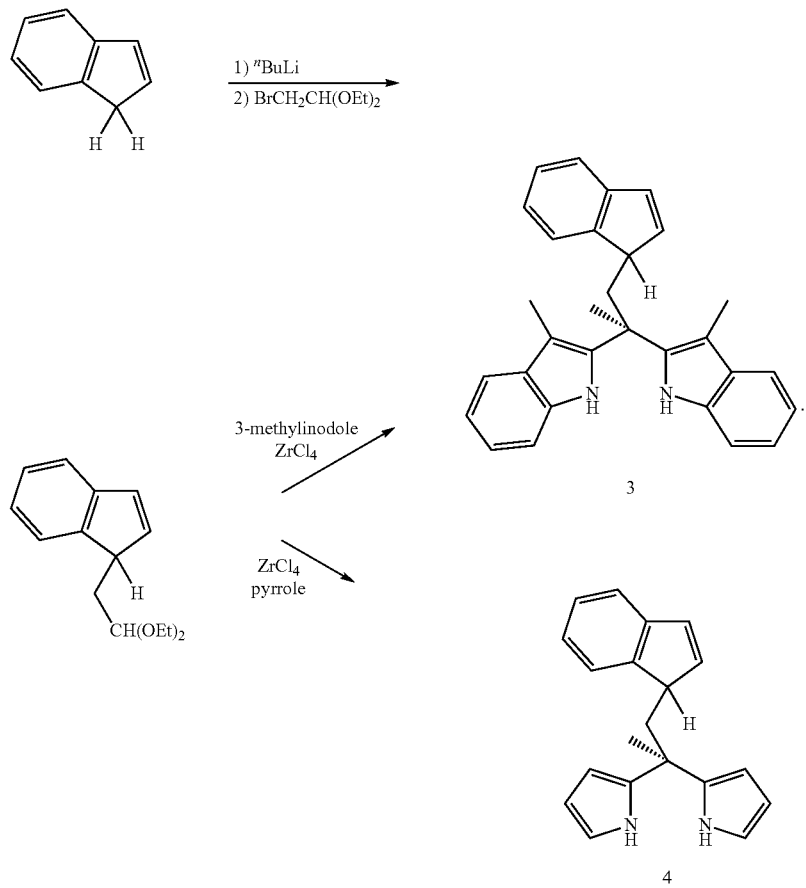

Also provided are methods to make a constrained geometry catalyst (CGC) comprising utilizing a compound of claim 1 as a precursor.

Also provided are constrained geometry catalysts produced by the methods herein.

Also provided are constrained geometry catalysts (CGC) comprising a compound herein coordinated to at least one metal. Particularly provided are those catalysts wherein the metal is a Group 4, 5 or 6 metal, such as titanium, zirconium, vanadium, niobium, chromium, or molybdenum.

Also provided are constrained geometry catalysts comprising a compound herein. In particular, there are provided catalysts comprising: i) an activator; and ii) an organometallic complex comprising a Group 4, Group 5 or Group 6 metal, M, and at least one compound of claim 1 that is $\eta^5$ bonded to M. Included are those catalysts which further comprises a metal or metal complex having: i) an $\eta^5$ (eta-5) coordination of at least one moiety selected from: a cyclopentadienyl ring, an indenyl ring, and a fluorenyl ring; and ii) an $\eta^1$ coordination of each of at least two pyrrolyl or indolyl groups; wherein at least two pyrrolyl or indolyl groups are coordinated to the metal or metal complex; and/or, wherein the coordination of at least two pyrrolyl or indolyl groups of the trianionic ligand forms a six-membered chelate ring; and/or wherein at least one metal M is a Group 4, a Group 5 or a Group 6 metal.

Also provided are methods to make at least one polymer, comprising synthesizing a constrained geometry catalyst using a compound of claim 1 as a precursor, and using the constrained geometry catalyst in a polymerization reaction.

Also provided are methods to make a polymer, comprising using a constrained geometry catalyst of claim 27 in a polymerization process. Particularly provided are those methods wherein the method comprises polymerization of a compound selected from the group consisting of: alkenes, alkynes, epoxides, cyclic ethers, lactams, lactides and lactones; and/or wherein the method comprises a polymerization process according to FIG. 5—Scheme I; and/or wherein the method comprises ring-opening polymerization of at least one epoxide, lactone, lactide, lactam, or cyclic ether according to FIG. 9—Scheme IV.

Also provided are methods to achieve a metathesis of at least one chemical, comprising synthesizing a constrained geometry catalyst using a compound of claim 1 as a precursor, and using the constrained geometry catalyst in a metathesis reaction.

Also provided are methods to achieve a metathesis of at least one chemical, comprising using a constrained geometry catalyst of herein in a metathesis process. Particularly provided are those methods wherein the method comprises a metathesis process according to FIG. 6—Scheme II.

Also provided are methods to hydroaminate at least one chemical, comprising synthesizing a constrained geometry catalyst using a compound of claim 1 as a precursor, and using the constrained geometry catalyst in a hydroamination reaction. Particularly provided are those methods to hydroaminate of at least one chemical, comprising using a constrained geometry catalyst herein in a metathesis process; and/or wherein the method comprises a hydroamination process according to FIG. 8—Scheme III.

Also provided are methods for making a supported catalyst for a polymerization process, comprising: a.) providing a catalyst comprising: a compound of claim 1 complexed with a metal, b.) mixing the catalyst with an activator, an inert support and an unreactive hydrocarbon solvent; and c.) removing the solvent to yield the supported catalyst. Particularly provided are such methods wherein the metal comprises a Group 4-6 metal; and/or wherein the activator comprises one or more of: an aluminum alkyl, an organoboron reagent, an aluminoxane, a triphenyl carbenium, a dimethyl anilinium, and mixtures and salts thereof; and/or wherein the inert support comprises one or more of: silica, alumina, aluminophosphate, aluminosilicate, magnesia, and titania, and mixtures thereof; and/or wherein the unreactive hydrocarbon solvent comprises at least one of toluene and hexane; and/or wherein the solvent is removed by vacuum distillation.

Also provided are methods for making a supported catalyst, comprising: a.) providing a catalyst comprising a compound of claim 1 and a metal, wherein one or more substituents on the compound includes at least one group capable of binding to an inert support surface; b.) mixing the catalyst with an activator, the inert support, and an unreactive hydrocarbon solvent; and c.) removing the solvent to yield the supported catalyst. Particularly provided are such methods, wherein at least one of the substituent groups is a $CH_2(CH_2)nSi(OEt)_3$ group such that the metal is covalently attached to the inert support by reaction of surface hydroxyl groups with the Si—OEt group and by formation of support O—Si linkages and ethanol.

Other systems, methods, features, and advantages of the present invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE FIGURES

The patent or application file contains one or more drawings executed in color and/or one or more photographs. Copies of this patent or patent application publication with color drawing(s) and/or photograph(s) will be provided by the Patent Office upon request and payment of the necessary fee.

FIG. 5—Scheme I is a schematic illustration of polymerization of ethylene with cationic complexes of niobium using a trianionic precursor compound.

FIG. 6—Scheme II is a schematic illustration of metathesis of alkenes using a niobium complex of a trianionic ligand.

FIG. 7 is a schematic illustration of a representative alkylidyne complex used in metathesis of alkynes and catalyzed using a molybdenum or tungsten complex of a trianionic ligand.

FIG. 8—Scheme III is a schematic illustration of hydroamination of ethylene using a niobium complex of a trianionic ligand.

FIG. 9—Scheme IV is a schematic illustration of polymerization of ethylene oxide using a zirconium complex of a trianionic ligand.

DETAILED DESCRIPTION OF THE INVENTION

Figure 1A:
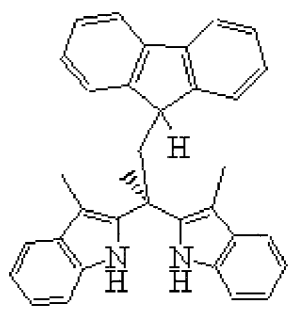
FIGS. 1A-1D are schematic illustrations of trianionic precursor compounds 1-4.
Figure 1B:
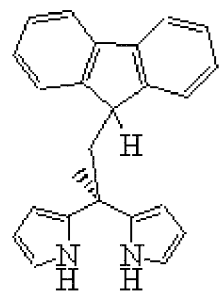
Figure 1C:
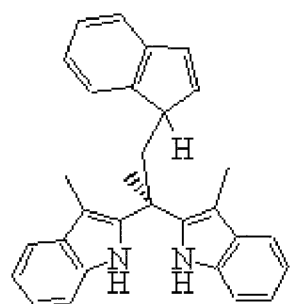
Figure 1D:
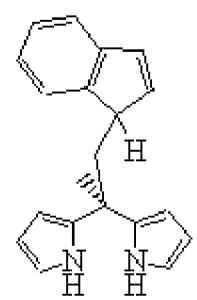

The trianionic ligand precursor compounds described herein are useful in making both homogeneous and heterogeneous catalysts that are, in effect, single-site molecular complexes. These catalysts (which can include niobium, titanium, zirconium, or other transition metals) are useful to replace traditional Ziegler-Natta catalysts for the polymerization of alkenes. It is also within the contemplated scope of the invention that other metals such as nickel, palladium, and platinum can be used.

These trianionic ligand catalysts allow precise and previously unprecedented control over polymer properties, including tacticity and molecular weight.

The trianionic ligand precursor compounds (which bind to a metal or metal complex) allow for the modification and/or alteration in the selectivity of the resulting catalysts.

The trianionic ligand precursor compounds for use in single-site catalyst systems are of considerable commercial interest for a variety of applications. The trianionic ligand precursor compounds are especially useful in the formation of constrained geometry catalysts (CGCs). Non-limiting examples of especially useful applications include the use of the trianionic ligand CGCs for metathesis reactions, for hydroamination reactions, and for oligomerization an/or polymerization reactions.

The trianionic ligand constrained geometry catalysts (CGCs) have several advantages over prior types of CGC catalysts. For example, the $\eta^1$-N coordinated pyrrolyl, indolyl, and carbazolyl groups in many CGCs are poorer π-electron donors to metals and are poorer bridging groups, as compared with strongly π-donating amide, alkoxide, and thiolate groups as found in most CGCs. The decreased π donation and increased electron-withdrawing ability of pyrrolyl and indolyl containing ligands increases the electrophilicity (and catalytic activity) at the metal centers of the catalysts.

Most ligands for CGCs are dianions, and contain one anionic cyclopentadienyl, indenyl, or fluorenyl moiety with one pendant group. The pendant group typically contains one anionic donor, such as an amide, alkoxide, or phenoxide, with an amide being most common.

In contrast, the trianionic ligand precursor compounds described herein have a pendant group containing two pyrrolyl or indolyl donors, thus making the ligands trianions upon deprotonation and coordination to a metal.

In certain embodiments described herein, upon deprotonation, the coordination of the two pyrrolyl or indolyl groups of the trianionic ligand precursor compound results in the formation of a six-membered chelate ring. The presence of the six-membered chelate ring (in addition to the $\eta^5$ (eta-5) coordination of the cyclopentadienyl, indenyl, or fluorenyl ring) further differentiates the present disclosure from previously reported constrained geometry ligands for alkene polymerization.

The use of a trianionic ligand precursor compound allows the formation of cationic CGCs of Group 5 metals for a polymerization processes, thus extending the use of CGCs from Group 4 metals to Groups 5 and 6. Furthermore, the steric environment around the metal is significantly different than that obtained with the dianionic CGC ligands previously reported. This change in steric environment affects catalyst activity and selectivity.

For polymerization reactions, the trianionic new ligands allow precise control over polymer properties, including tacticity and molecular weight. The trianionic ligands for single-site catalysts are of considerable commercial interest for a variety of applications, including metathesis reactions, hydroamination reactions, and oligomerization and polymerization of alkenes, epoxides, cyclic ethers, lactams, lactides and lactones.

Non-limiting examples of uses for the trianionic ligand precursor compounds include uses for producing constrained geometry catalysts in the polyolefins, polyethers, fine chemicals, and pharmaceutical industries.

In a particular aspect, there is provided herein a catalyst system for CGCs comprising a triply deprotonated, trianionic ligand precursor compound having: i) an $\eta^5$ (eta-5) coordination of at least one moiety selected from: a cyclopentadienyl ring, an indenyl ring, and a fluorenyl ring; and ii) an $\eta^1$ coordination of each of at least two pyrrolyl or indolyl groups; wherein at least two pyrrolyl or indolyl groups are coordinated to a metal.

As used herein,

"Alkyl" refers to monovalent alkyl groups preferably having from 1 to 10 carbon atoms and more preferably 1 to 6 carbon atoms. This term is exemplified by groups such as methyl, ethyl, n-propyl, iso-propyl, n-butyl, iso-butyl, n-hexyl, and the like.

"Substituted alkyl" refers to an alkyl group, preferably of from 1 to 10 carbon atoms, having from 1 to 3 substituents selected from the group consisting of alkoxy, substituted alkoxy, acyl, acylamino, amino, aminoacyl, aminocarboxy esters, cyano, cycloalkyl, halogen, hydroxyl, carboxyl, carboxylalkyl, oxyacyl, oxyacylamino, thiol, thioalkoxy, substituted thioalkoxy, aryl, heteroaryl, heterocyclic, aryloxy, thioaryloxy, heteroaryloxy, thioheteroaryloxy, nitro, and mono- and di-alkylamino, mono- and di-(substituted alkyl)amino, mono- and di-arylamino, mono- and di-heteroarylamino, mono- and di-heterocyclic amino, and unsymmetric di-substituted amines having different substituents selected from alkyl, substituted alkyl, aryl, heteroaryl and heterocyclic.

"Substituted silicon" refers to a silicon group having from 1 to 3 substituents selected from the group consisting of alkyl, substituted alkyl, aryl, substituted aryl, and silyl and substituted silyl.

"Alkylene" refers to divalent alkylene groups preferably having from 1 to 10 carbon atoms and more preferably 1 to 6 carbon atoms. This term is exemplified by groups such as methylene (—CH$_2$—), ethylene (—CH$_2$CH$_2$—), the propylene isomers (e.g., —CH$_2$CH$_2$CH$_2$— and —CH(CH$_3$)CH$_2$—), and the like.

"Alkaryl" refers to -alkylene-aryl groups preferably having from 1 to 10 carbon atoms in the alkylene moiety and from 6 to 10 carbon atoms in the aryl moiety. Such alkaryl groups are exemplified by benzyl, phenethyl and the like.

"Alkoxy" refers to the group "alkyl-O—". Preferred alkoxy groups include, by way of example, methoxy, ethoxy, n-propoxy, iso-propoxy, n-butoxy, tert-butoxy, sec-butoxy, n-pentoxy, n-hexoxy, 1,2-dimethylbutoxy, and the like.

"Substituted alkoxy" refers to the group "substituted alkyl-O—" where substituted alkyl is as defined above.

"Alkenyl" refers to alkenyl groups preferably having from 2 to 10 carbon atoms and more preferably 2 to 6 carbon atoms and having at least 1 and preferably from 1-2 sites of alkenyl unsaturation. Preferred alkenyl groups include ethenyl (—CH=CH$_2$), n-propenyl (—CH$_2$CH=CH$_2$), iso-propenyl (—C(CH$_3$)=CH$_2$), but-2-enyl (—CH$_2$CH=CHCH$_3$), and the like.

"Substituted alkenyl" refers to an alkenyl group as defined above having from 1 to 3 substituents selected from the group consisting of alkoxy, substituted alkoxy, acyl, acylamino, amino, aminoacyl, aminocarboxy esters, cyano, halogen, hydroxyl, carboxyl, carboxylalkyl, cycloalkyl, oxyacyl, oxyacylamino, thiol, thioalkoxy, substituted thioalkoxy, aryl, heteroaryl, heterocyclic, nitro, and mono- and di-alkylamino, mono- and di-(substituted alkyl)amino, mono- and di-arylamino, mono- and di-heteroarylamino, mono- and di-heterocyclic amino, and unsymmetric di-substituted amines having different substituents selected from alkyl, substituted alkyl, aryl, heteroaryl and heterocyclic.

"Alkenylene" refers to divalent alkenylene groups preferably having from 2 to 8 carbon atoms and more preferably 2 to 6 carbon atoms. This term is exemplified by groups such as ethenylene (—CH=CH—), the propenylene isomers (e.g., —CH$_2$CH=CH— and —C(CH$_3$)=CH—) and the like.

"Substituted alkenylene" refers to an alkenylene group, preferably of from 2 to 8 carbon atoms, having from 1 to 3 substituents selected from the group consisting of alkoxy, substituted alkoxy, acyl, acylamino, acyloxy, amino, aminoacyl, aminoacyloxy, cyano, halogen, hydroxyl, carboxyl, carboxylalkyl, thiol, thioalkoxy, substituted thioalkoxy, aryl, heteroaryl, heterocyclic, nitro, and mono- and di-alkylamino, mono- and di-(substituted alkyl)amino, mono- and di-arylamino, mono- and di-heteroarylamino, mono- and di-heterocyclic amino, and unsymmetric di-substituted amines having different substituents selected from alkyl, substituted alkyl, aryl, heteroaryl and heterocyclic. Additionally, such substituted alkylene groups include those where 2 substituents on the alkylene group are fused to form one or more cycloalkyl, aryl, heterocyclic or heteroaryl groups fused to the alkylene group.

"Alkynyl" refers to alkynyl groups preferably having from 2 to 10 carbon atoms and more preferably 2 to 6 carbon atoms and having at least 1 and preferably from 1-2 sites of alkynyl unsaturation. Preferred alkynyl groups include ethynyl (—C≡CH), propargyl (—CH$_2$C≡CCH) and the like.

"Substituted alkynyl" refers to an alkynyl group as defined above having from 1 to 3 substituents selected from the group consisting of alkoxy, substituted alkoxy, acyl, acylamino, amino, aminoacyl, aminocarboxy esters, cyano, halogen, hydroxyl, carboxyl, carboxylalkyl, cycloalkyl, oxyacyl, oxyacylamino, thiol, thioalkoxy, substituted thioalkyoxy, aryl, heteroaryl, heterocyclic, nitro, and mono- and di-alkylamino, mono- and di-(substituted alkyl)amino, mono- and di-arylamino, mono- and di-heteroarylamino, mono- and di-heterocyclic amino, and unsymmetric di-substituted amines having different substituents selected from alkyl, substituted alkyl, aryl, heteroaryl and heterocyclic.

"Aryl" refers to an unsaturated aromatic carbocyclic group of from 6 to 14 carbon atoms having a single ring (e.g., phenyl) or multiple condensed rings (e.g., naphthyl or anthryl). Preferred aryls include phenyl, naphthyl and the like.

Unless otherwise constrained by the definition for the aryl substituent, such aryl groups can optionally be substituted with from 1 to 3 substituents selected from the group consisting of hydroxy, acyl, alkyl, alkoxy, alkenyl, alkynyl, substituted alkyl, substituted alkoxy, substituted alkenyl, substituted alkynyl, amino, aminoacyl, aminocarboxy esters, alkaryl, aryl, aryloxy, carboxyl, carboxylalkyl, acylamino, cyano, halo, nitro, heteroaryl, heterocyclic, oxyacyl, oxyacylamino, thioalkoxy, substituted thioalkoxy, trihalomethyl, mono- and di-alkylamino, mono- and di-(substituted alkyl) amino, mono- and di-arylamino, mono- and di-heteroarylamino, mono- and di-heterocyclic amino, and unsymmetric di-substituted amines having different substituents selected from alkyl, substituted alkyl, aryl, heteroaryl and heterocyclic, and the like. Preferred substituents include alkyl, alkoxy, halo, cyano, nitro, trihalomethyl, and thioalkoxy.

"Aryloxy" refers to the group aryl-O— wherein the aryl group is as defined above including optionally substituted aryl groups as also defined above.

"Carboxyalkyl" refers to the groups —C(O)O-alkyl and —C(O)O-substituted alkyl where alkyl and substituted alkyl are as defined above.

"Cycloalkyl" refers to cyclic alkyl groups of from 3 to 8 carbon atoms having a single cyclic ring or multiple condensed rings which can be optionally substituted with from 1 to 3 alkyl groups. Such cycloalkyl groups include, by way of example, single ring structures such as cyclopropyl, cyclobutyl, cyclopentyl, cyclooctyl, 1-methylcyclopropyl, 2-methylcyclopentyl, 2-methylcyclooctyl, and the like, or multiple ring structures such as adamantanyl, and the like.

"Substituted cycloalkyl" refers to cycloalkyl groups having from 1 to 5 (preferably 1 to 3) substituents selected from the group consisting of hydroxy, acyl, acyloxy, alkyl, substituted alkyl, alkoxy, substituted alkoxy, alkenyl, substituted alkenyl, alkynyl, substituted alkynyl, amino, aminoacyl, alkaryl, aryl, aryloxy, carboxyl, carboxylalkyl, cyano, halo, nitro, heteroaryl, thioalkoxy, substituted thioalkoxy, trihalomethyl and the like.

"Cycloalkenyl" refers to cyclic alkenyl groups of from 4 to 8 carbon atoms having a single cyclic ring and at least one point of internal unsaturation which can be optionally substituted with from 1 to 3 alkyl groups. Examples of suitable cycloalkenyl groups include, for instance, cyclobut-2-enyl, cyclopent-3-enyl, cyclooct-3-enyl and the like.

"Substituted cycloalkenyl" refers to cycloalkenyl groups having from 1 to 5 substituents selected from the group consisting of hydroxy, acyl, acyloxy, alkyl, substituted alkyl, alkoxy, substituted alkoxy, alkenyl, substituted alkenyl, alkynyl, substituted alkynyl, amino, aminoacyl, alkaryl, aryl, aryloxy, carboxyl, carboxylalkyl, cyano, halo, nitro, heteroaryl, thioalkoxy, substituted thioalkoxy, trihalomethyl and the like.

"Halo" or "halogen" refers to fluoro, chloro, bromo and iodo and preferably is either chloro or bromo.

"Heteroaryl" refers to a monovalent aromatic carbocyclic group of from 2 to 10 carbon atoms and 1 to 4 heteroatoms selected from oxygen, nitrogen and sulfur within the ring.

Unless otherwise constrained by the definition for the heteroaryl substituent, such heteroaryl groups can be optionally substituted with 1 to 3 substituents selected from the group consisting of hydroxy, acyl, alkyl, alkoxy, alkenyl, alkynyl, substituted alkyl, substituted alkoxy, substituted alkenyl, substituted alkynyl, amino, aminoacyl, aminocarboxy esters, alkaryl, aryl, aryloxy, carboxyl, carboxylalkyl, aminoacyl, cyano, halo, nitro, heteroaryl, heterocyclic, oxyacyl, oxyacylamino, thioalkoxy, substituted thioalkoxy, trihalomethyl, mono- and di-alkylamino, mono- and di-(substituted alkyl) amino, mono- and di-arylamino, mono- and di-heteroarylamino, mono- and di-heterocyclic amino, and unsymmetric di-substituted amines having different substituents selected from alkyl, substituted alkyl, aryl, heteroaryl and heterocyclic, and the like. Preferred substituents include alkyl, alkoxy, halo, cyano, nitro, trihalomethyl, and thioalkoxy.

Such heteroaryl groups can have a single ring (e.g., pyridyl or furyl) or multiple condensed rings (e.g., indolizinyl or benzothienyl). Preferred heteroaryls include pyridyl, pyrrolyl and furyl.

"Heterocycle" or "heterocyclic" refers to a monovalent saturated or unsaturated group having a single ring or multiple condensed rings, from 1 to 8 carbon atoms and from 1 to 4 hetero atoms selected from nitrogen, sulfur or oxygen within the ring.

Unless otherwise constrained by the definition for the heterocyclic substituent, such heterocyclic groups can be optionally substituted with 1 to 3 substituents selected from the group consisting of hydroxy, acyl, alkyl, alkoxy, alkenyl, alkynyl, substituted alkyl, substituted alkoxy, substituted alkenyl, substituted alkynyl, amino, aminoacyl, aminocarboxy esters, alkaryl, aryl, aryloxy, carboxyl, carboxylalkyl, aminoacyl, cyano, halo, nitro, heteroaryl, heterocyclic, oxyacyl, oxyacylamino, thioalkoxy, substituted thioalkoxy, trihalomethyl, mono- and di-alkylamino, mono- and di-(substituted alkyl)amino, mono- and di-arylamino, mono- and di-heteroarylamino, mono- and di-heterocyclic amino, and unsynumetric di-substituted amines having different substituents selected from alkyl, substituted alkyl, aryl, heteroaryl and heterocyclic, and the like. Such heterocyclic groups can have a single ring or multiple condensed rings. Preferred heterocyclics include morpholino, piperidinyl, and the like.

Examples of heterocycles and heteroaryls include, but are not limited to, pyrrole, imidazole, pyrazole, pyridine, pyrazine, pyrimidine, pyridazine, indolizine, isoindole, indole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, phenoxazine, phenothiazine, imidazolidine, imidazoline, piperidine, piperazine, indoline, phthalimide, 1,2,3,4-tetrahydroisoquinoline, 4,5,6,7-tetrahydrobenzo[b]thiophene, thiazole, thiazolidine, thiophene, benzo[b]thiophene, morpholino, piperidinyl, pyrrolidine, tetrahydrofuranyl, and the like.

The term, "Group 13, 14, 15, or 16 element" refers to the periodic table designations of the elements, and includes any element in the referenced groups, including, without limitation: the Group 13 elements of boron, aluminum, allium, indium, thallium; the Group 14 elements of carbon, silicon, germanium, tin, lead; the Group 15 elements of nitrogen, phosphorous, arsenic, antimony, bismuth; and the Group 16 elements of oxygen, sulfur, selenium, tellurium, polonium.

The term "Group 4, 5 or 6 metal" refers to the periodic table designations of the elements, and includes any element in the referenced groups, including, without limitation: Group 4 metals of titanium, zirconium, hafnium; the Group 5 metals of vanadium, niobium, tantalum; the Group 6 metals of chromium, molybdenum, tungsten (aka wolfram).

"At least one metal" includes metals and metal complexes of either single metals or a combination of metals, including complexes with other elements.

Unless otherwise constrained by the definition for the aryl substituent, such aryl groups can optionally be substituted with from 1 to 3 substituents selected from the group consisting of hydroxy, acyl, alkyl, alkoxy, alkenyl, alkynyl, substituted alkyl, substituted alkoxy, substituted alkenyl, substituted alkynyl, amino, aminoacyl, aminocarboxy esters, alkaryl, aryl, aryloxy, carboxyl, carboxylalkyl, acylamino, cyano, halo, nitro, heteroaryl, heterocyclic, oxyacyl, oxyacylamino, thioalkoxy, substituted thioalkoxy, trihalomethyl, mono- and di-alkylamino, mono- and di-(substituted alkyl) amino, mono- and di-arylamino, mono- and di-heteroarylamino, mono- and di-heterocyclic amino, and unsymmetric di-substituted amines having different substituents selected from alkyl, substituted alkyl, aryl, heteroaryl and heterocyclic, and the like.

When a compound represented by Structural Formula A-N has more than one chiral substituent it may exist in diastereoisomeric forms. The diastereoisomeric pairs may be separated by methods known to those skilled in the art, for example chromatography or crystallization and the individual enantiomers within each pair may be separated using methods familiar to the skilled artisan. The present invention includes each diastereoisomer of compounds of Structural Formula A-N and mixtures thereof.

Certain compounds of Structural Formula A-N may exist in different stable conformational forms which may be separable. Torsional asymmetry due to restricted rotation about an asymmetric single bond, for example because of steric hindrance or ring strain, may permit separation of different conformers. The present invention includes each conformational isomer of compounds of Structural Formula A-N and mixtures thereof.

Certain compounds of Structural Formula A-N may exist in zwitterionic form and the present invention includes each zwitterionic form of compounds of Structural Formula A-N and mixtures thereof.

FIGS. 1A-1D are schematic illustrations of trianionic ligand precursor compounds, compounds 1-4, respectively. The trianionic ligand precursor compounds include at least one fluorenyl or indenyl moiety bridged to a pyrrolyl or indolyl that are capable, upon deprotonation, of binding a metal to form an organometallic complex. In one non-limiting example, the organometallic complex includes at least one of a diindolylmethane or dipyrrolylmethane group coordinated to at least one metal. In such embodiments, the coordination of the two pyrrolyl or indolyl groups forms a six-membered chelate ring.

For the polymerization and oligomerization of alkenes, transition metals are preferably from Group 4 (non-limiting examples include: titanium, zirconium, hafnium), Group 5 (non-limiting examples include: vanadium, niobium, tantalum) or Group 6 (non-limiting examples include: chromium, molybdenum, tungsten). In particular embodiments, the metal can be niobium or zirconium.

In particular, provided herein are compounds represented by the structures:

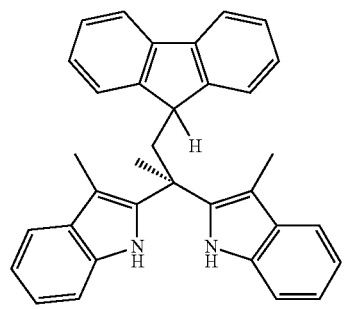

1

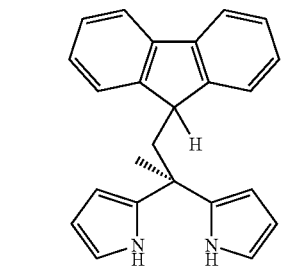

2

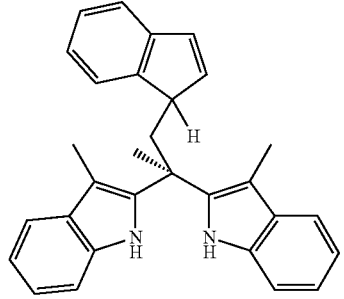

3

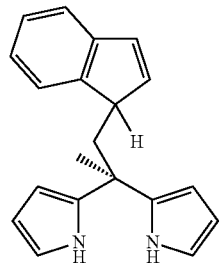

4

Also provided herein are compounds comprised of at least one of a fluorenyl or indenyl moiety bridged to an organometallic complex. In certain embodiments, the organometallic complex comprising at least one of a diindolylmethane or dipyrrolylmethane group coordinated to at least one metal. In certain embodiments, at least one metal is a Group 4-6 metal.

Also provided herein are compounds represented by the structures (also referred to in the claims as Formulas B through G):

Formula B

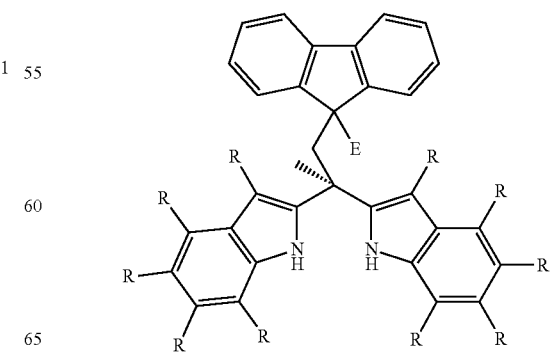

1a

Formula C

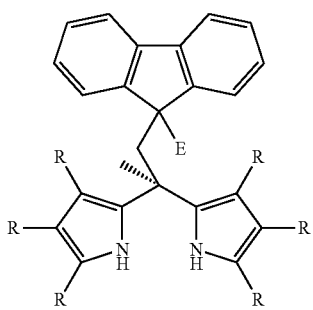

Formula D

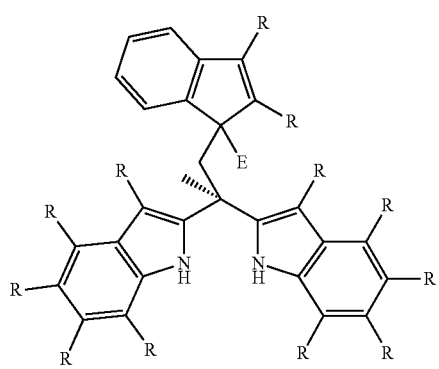

Formula E

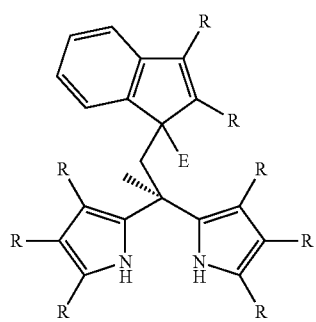

Formula F

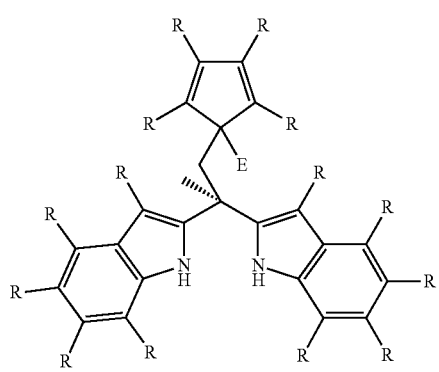

Formula G

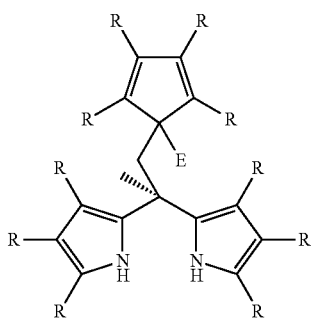

wherein:

E can be hydrogen, D or SiMe$_3$; and

R can be hydrogen, alkyl, aryl or heterocycle groups.

In another aspect, there is provided herein an organometallic complex having various sites of substitution and comprising at least one of a diindolylmethane or dipyrrolylmethane group coordinated to at least one metal. In certain embodiments, at least one metal is a Group 4-6 metal.

Also provided herein are compounds 1b-6b (also referred to in the claims solely as Formulas H, and J through N) represented by the structures:

Formula H

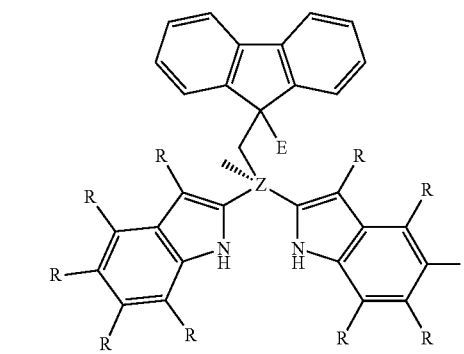

Formula J

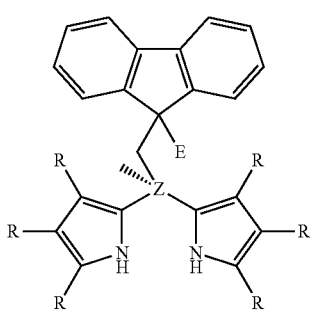

Formula K

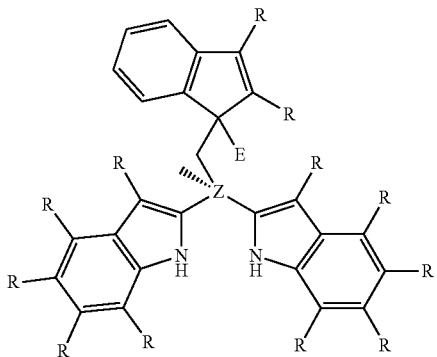

Formula L

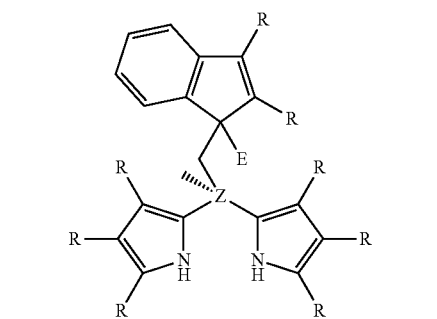

Formula M

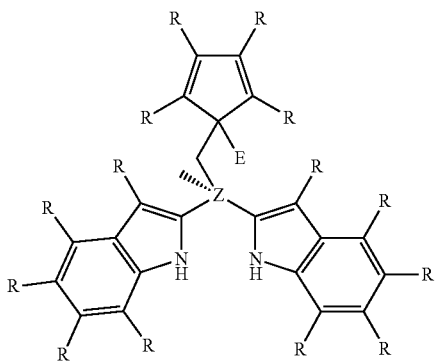

Formula N

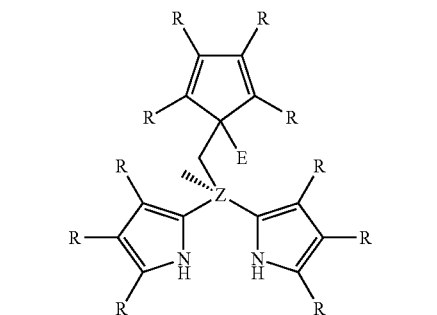

wherein:
Z can be a Group 13, 14 or 15 elements; for example, Si, Ge, Sn, P;
E can be hydrogen, D or SiMe$_3$; and
R can be hydrogen, alkyl, aryl or heterocycle groups.

It is to be understood that the terms "alkyl, aryl or heterocycle groups" can include, for example, unsubstituted, substituted or inertly substituted groups. It is also to be understood that the terms "alkyl, aryl or heterocycle groups" can include, for example, linear, branched, cyclic, aromatic, alkyl aromatic, arylalkyl, and the like groups.

Figure 2:
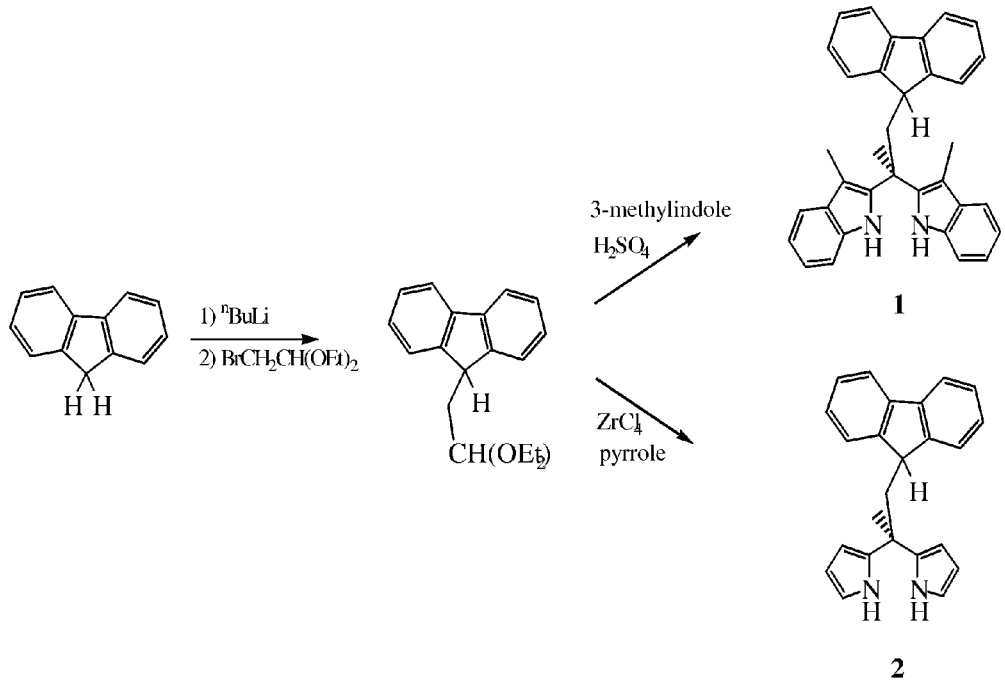
FIG. 2 is a schematic illustration of a synthetic route for the trianionic ligand precursor compounds 1-2 of FIGS. 1A-1B. Trianionic ligands are obtained by removing the two indolyl or pyrrolyl NH protons and the fluorenyl proton from compounds 1 and 2, respectively, upon coordination to a metal.

In another aspect, there is provided herein a method for making a trianionic ligand precursor compound 1 or 2 using a method as shown in FIG. 2.

Figure 3:
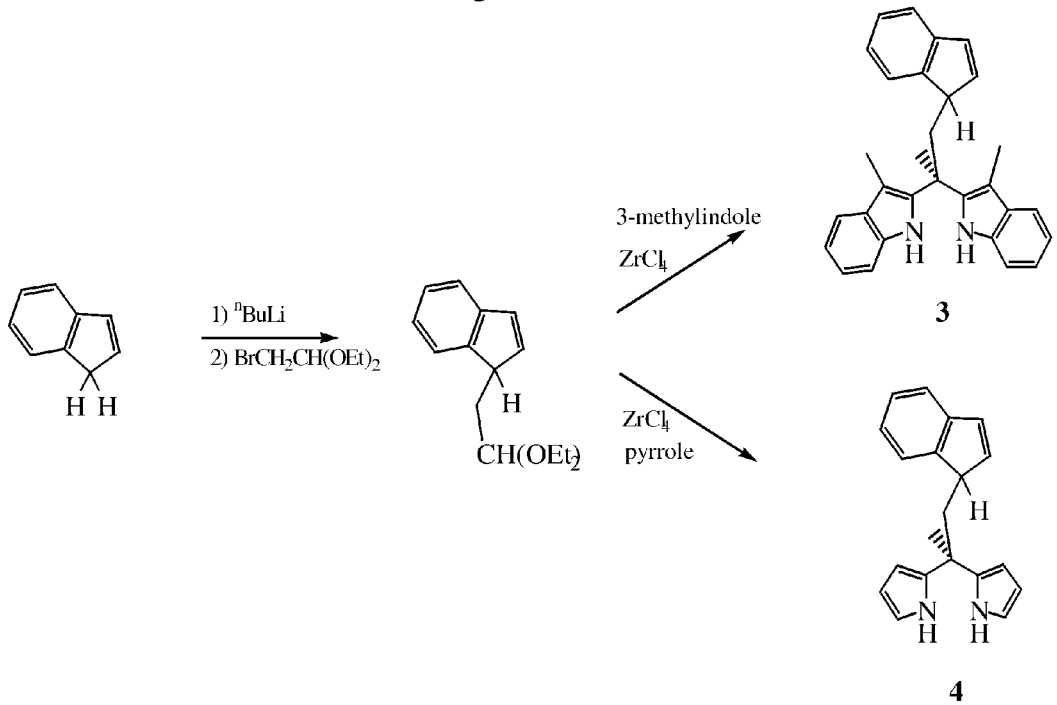
FIG. 3 is a schematic illustration of a synthetic route for the trianionic ligand precursor compounds 3-4 of FIGS. 1C-1D. Trianionic ligands are obtained by removing the two indolyl or pyrrolyl NH protons and the indenyl proton from compounds 3 and 4, respectively, upon coordination to a metal.
Figure 4A:
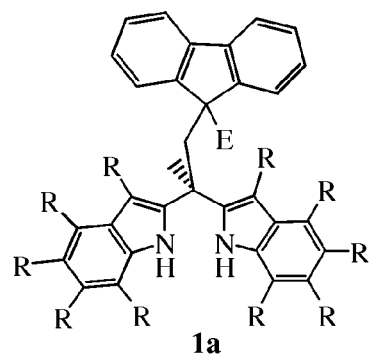
FIGS. 4A-4L are schematic illustrations of derivatives of trianionic precursor compounds 1-4 of FIGS. 1A-1D with various sites of substitution.
Figure 4B:
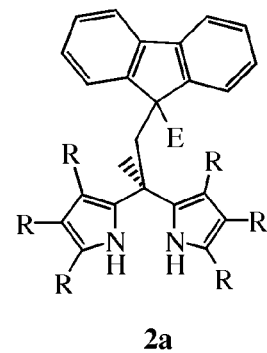
Figure 4C:
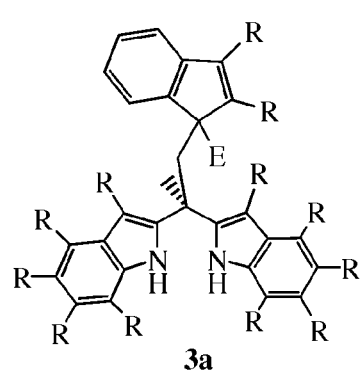
Figure 4D:
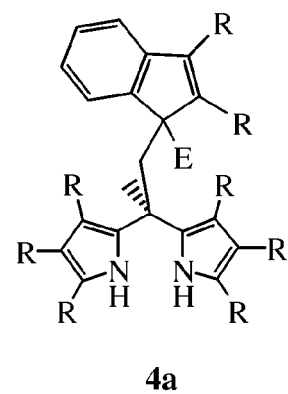
Figure 4E:
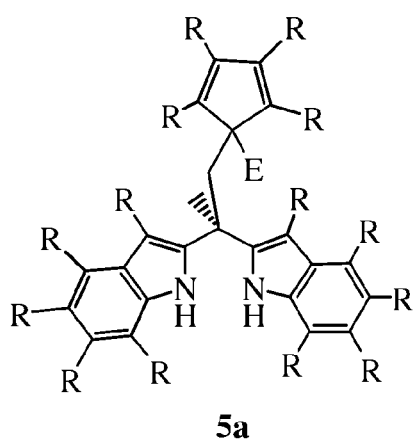
Figure 4F:
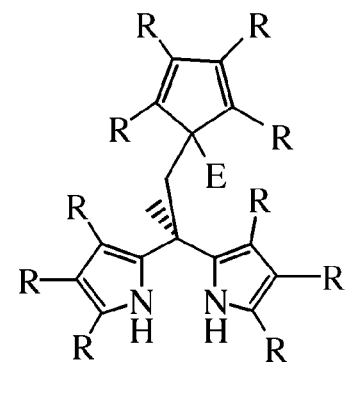
Figure 4G:
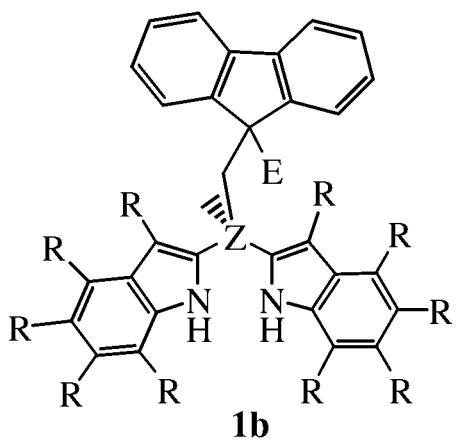
Figure 4H:
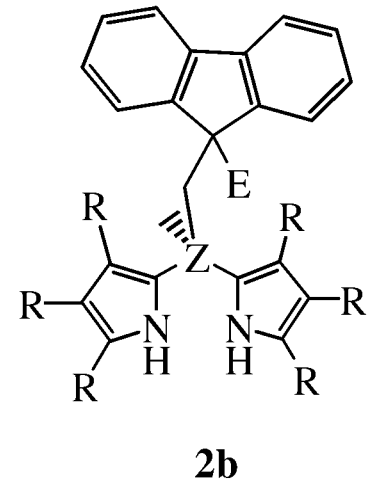
Figure 4I:
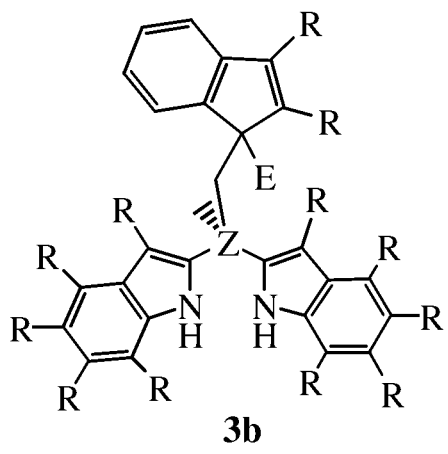
Figure 4J:
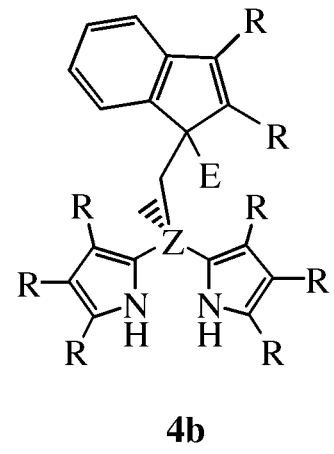
Figure 4K:
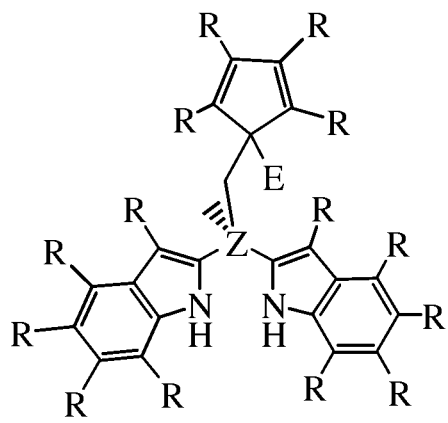
Figure 4L:
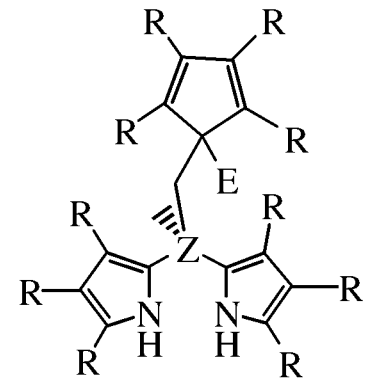

In another aspect, there is provided herein a method for making a trianionic ligand precursor compound 3 or 4 using the method as shown in FIG. 3.

FIGS. 4A-4L are schematic illustrations of derivatives of the trianionic ligand precursor compounds (compounds 1-4) of FIGS. 1A-1D with various sites of substitution. Each of the derivatives (compounds 1a-6a and 1b-6b) includes various sites of substitution and at least one of a diindolylmethane or dipyrrolylmethane group capable, upon deprotonation, of being coordinated to at least one metal.

In another aspect, there is provided herein a polymerization process comprising polymerizing at least one alkene in the presence of a catalyst system of using at least one trianionic ligand precursor compound as described herein.

Throughout this disclosure, various publications, patents and published patent specifications are referenced by an identifying citation. The disclosures of these publications, patents and published patent specifications are hereby incorporated by reference into the present disclosure to more fully describe the state of the art to which this invention pertains.

EXAMPLES

The present invention is further defined in the following Examples, in which all parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. All publications, including patents and non-patent literature, referred to in this specification are expressly incorporated by reference herein.

It is to be understood that the trianionic ligand precursor compounds may have various applications, including, but not limited to forming constrained geometry catalysts for the polymerization and oligomerization of monomers (e.g., FIG. 5—Scheme I), metathesis of alkenes and alkynes (e.g., FIG. 6—Scheme II), hydroamination (e.g., FIG. 8—Scheme III), ring-opening polymerization (e.g., FIG. 9—Scheme IV).

FIG. 5—Scheme I is a schematic illustration of polymerization of ethylene with cationic complexes of niobium using trianionic ligands where: (a) refers to methide abstraction, (b) refers to ethylene coordination, and (c) refers to ethylene insertion. As shown in FIG. 5, X$^-$ can be a weakly coordinating anion, such as, but not limited to, B(C$_6$F$_5$)$_4^-$.

It is to be understood that homogeneous polymerization can be conducted in an organic solvent such as toluene. Also, alkene polymerization with cationic complexes can occur (as outlined in FIG. 5—Scheme I for niobium). Non-limiting examples of methide abstraction reagents in step (a) include, but are not limited to, an aluminoxane (e.g., methyl alumoxane (MAO)), an aluminum alkyl, a boron alkyl or aryl such as B(C$_6$F$_5$)$_3$, [Ph$_3$C$^+$][X$^-$], or [HMe$_2$NPh$^+$][X$^-$], where X$^-$ is a weakly coordinating anion. Further, in certain embodiments, polymerization can also occur using neutral complexes of the Group 4 metals by a mechanism similar to that shown in FIG. 5—Scheme I.

FIG. 6—Scheme II is schematic illustration of metathesis of alkenes using an alkylidene complex of a trianionic ligand. In certain embodiments, the metathesis can occur using metals from Group 5. It is to be understood that ring-closing metathesis, ring-opening metathesis polymerization and alkyne metathesis reactions can be catalyzed by these alkylidene complexes.

FIG. 7 is a schematic illustration of a representative alkylidyne (carbyne) trianionic ligand catalyst that can be used in the metathesis of alkynes. It should be understood that mechanistically, alkyne metathesis is similar to the metathesis of alkenes as shown in FIG. 6—Scheme II.

FIG. 8—Scheme III is a schematic illustration of hydroamination of ethylene using a trianionic ligand catalyst where the addition of an N—H bond across a C—C double bond to form an amine. Both intermolecular and intramolecular hydroamination of alkenes, and alkynes, can occur. In particular, FIG. 8 illustrates a pathway for intermolecular hydroamination of ethylene for a Group 5 metal.

FIG. 9—Scheme IV is a schematic illustration of a ring-opening polymerization of ethylene oxide using a trianionic ligand catalyst. It is to be understood that polymerization of lactones, lactides, lactams, and cyclic ethers can occur as generally depicted in FIG. 9—Scheme IV for epoxide polymerization. In certain embodiments, the process comprising using at least one metal from Groups 3 to 14. In certain embodiments, metals from Groups 3, 4, 5, 6, 13, and 14 can be preferred for these polymerizations.

Also within the scope of the present invention is the use of such polymerization of epoxides to yield industrially important polyether elastomers. Non-limiting examples of application include elastomers utilized for automotive applications and, more recently, electrolytes for lithium batteries for electric or hybrid vehicles.

Also within the scope of the present invention is the use of such polymerization of lactones and lactide to yield industrially important biodegradable polyesters.

Examples of Methods of Making Trianionic Ligand Precursor Compounds

General Procedures

All air-sensitive reactions were performed in an inert atmosphere of purified nitrogen using standard inert atmosphere techniques and an inert atmosphere glove box. Pyrrole, 3-methylindole, fluorene, indene, dicyclopentadiene, n-butyllithium, and bromoacetaldehyde diethylacetal were purchased from Aldrich Chemical Company and used as received. Solvents were purchased from Fisher Scientific. Toluene and hexanes were distilled from sodium and calcium hydride, respectively. Diethyl ether and tetrahydrofuran (THF) were distilled from sodium benzophenone prior to use. Chloroform-d ($CDCl_3$) was dried by storage over activated molecular sieves.

The compounds and structures of ligand precursors, ligands, and metal complexes were confirmed by a combination of one or more of the following: NMR spectroscopy, elemental analysis, and X-ray crystallography. Solution NMR spectra were recorded on a Varian Bruker AS-600 spectrometer using deuterated solvent as an internal lock. Chemical shifts are reported relative to tetramethylsilane. $^1$H and $^{13}$C spectral assignments were aided by 2D-COSY and 2D-HMQC and 2D-HMBC experiments.

Condensation of aldehydes or diethylacetals with pyrrole or indole derivatives can, in general, be catalyzed with a variety of protic and Lewis acids, including sulfuric acid, hydrochloric acid, trifluoroacetic acid, boron trifluoride, zirconium(IV) chloride, and metal triflates. Examples D-H illustrate the synthesis of new ligands by condensation of diethylacetal precursors with pyrrole or 3-methylindole using sulfuric acid or zirconium(IV) chloride as a catalyst, but other catalysts can be used.

Examples A-C of Ligand Precursor Syntheses

Example A

Synthesis of Fluorenyl Acetaldehyde Diethylacetal

A solution of n-butyllithium (100.0 mL, 1.6 M, 0.161 mol) in hexanes was added dropwise to a cooled (0° C.) solution of fluorene (26.75 g, 0.161 mol) in 200 mL of diethyl ether. The reaction solution turned orange and was warmed to 25° C. for 30 minutes. The orange solution was added dropwise to a cooled (0° C.) solution of bromoacetaldehyde diethylacetal (25.0 mL, 0.161 mol) in 50 mL of diethyl ether. The reaction solution was stirred for 12 hours and the solvent then removed in vacuo leaving purple oil. Methylene chloride (300 mL) was added to the residue to give a cloudy white mixture, which was extracted with deionized water (5×100 mL). The yellow organic layer was dried over Na2SO4 and the solids were then separated by filtration. Solvent was removed from the filtrate in vacuo to leave a pale yellow oil which solidified to a yellow waxy solid upon standing. Yield: 42.2 g, 0.149 mol (93%). $^1$H NMR ($CDCl_3$, 600 MHz): δ 7.73 (d, $^3J_{HH}$=7.8 Hz, 2H, flu-H4), 7.54 (d, $^3J_{HH}$=7.8 Hz, 2H, flu-H1), 7.34 (t, $^3J_{HH}$=7.2 Hz, 2H, flu-H3), 7.28 (t, $^3J_{HH}$=7.2 Hz, 2H, flu-H2), 4.69 (t, $^3J_{HH}$=6.0 Hz, 1H, CH), 4.08 (t, $^3J_{HH}$=7.2 Hz, 1H, flu-CH), 3.52 (dm, 4H, $OCH_2CH_3$), 2.21 (dd, 2H, $CH_2$), 1.13 (t, $^3J_{HH}$=7.2 Hz, 6H, $OCH_2CH_3$). $^{13}$C{$^1$H} NMR ($CDCl_3$, 150.8 MHz): 147.25 (s, $C_1$_a), 140.81 (s, C4a), 126.96 (s, C2), 126.82 (s, C3), 124.73 (s, C1), 119.78 (s, C4), 101.41 (s, CH), 61.45 (s, $OCH_2CH_3$), 43.93 (s, C9), 37.49 (s, $CH_2$), 15.27 (s, $OCH_2CH_3$). MS (ES) m/z (assignment, relative intensity): 305.2 ($C_{19}H_{22}O_2Na$, [M+Na]$^+$, 100%). Anal. Calcd. for $C_{19}H_{22}O_2$: C, 80.82; H, 7.85. Found: C, 80.89; H, 8.09.

Example B

Synthesis of Indenyl Acetaldehyde Diethylacetal

A solution of n-butyllithium (20.0 mL, 1.6 M, 32.2 mmol) in hexanes was added dropwise to a cooled (0° C.) solution of indene (5.35 g, 32.2 mmol) in 50 mL of diethyl ether. The reaction solution turned yellow and was warmed to 25° C. for 30 minutes. This yellow solution was added dropwise to a cooled (0° C.) solution of bromoacetaldehyde diethylacetal (5.00 mL, 32.2 mmol) in 50 mL of diethyl ether. The reaction mixture turned bright red after warming to 25° C. and was stirred for 12 hours, during which time it darkened to brown. The solvent was then removed in vacuo leaving brown oil. Methylene chloride (100 mL) was added to give a cloudy white mixture which was extracted with deionized water (3×100 mL). The brown organic layer was dried over $Na_2SO_4$ and then solids were separated by filtration. Solvent was removed from the filtrate in vacuo resulting in brown oil. Yield: 5.48 g, 23.5 mmol (85%). $^1$H NMR ($CDCl_3$, 600 MHz): δ 7.43 (d, $^3J_{HH}$=7.2 Hz, 1H, H4), 7.35 (d, $^3J_{HH}$=7.8 Hz, 1H, H7), 7.25 (t, $^3J_{HH}$=7.2 Hz, 1H, H5), 7.19 (t, $^3J_{HH}$=7.2 Hz, 1H, H6), 6.80 (dd, 1H, H2), 6.61 (dd, 1H, H3), 4.68 (m, 1H, CH), 3.69 (dm, 2H, $OCH_2CH_3$), 3.56 (m, 1H, H1), 3.52 (dm, 2H, $OCH_2CH_3$), 2.22 (m, 1H, $CH_2$), 1.71 (m, 1H, $CH_2$), 1.24 (t, $^3J_{HH}$=7.2 Hz, 3H, $OCH_2CH_3$), 1.19 (t, $^3J_{HH}$=7.2 Hz, 3H, OCH$_2$CH$_3$). $^{13}$C{$^1$H} NMR (CDCl$_3$, 150.8 MHz): 147.51 (s, C7a), 144.13 (s, C3a), 139.13 (s, C3), 130.79 (s, C2), 126.56 (s, C5), 124.73 (s, C6), 123.00 (s, C4), 121.05 (s, C7), 102.10 (s, CH), 61.44 (s, OCH$_2$CH$_3$), 61.23 (s, OCH$_2$CH$_3$), 46.66 (s, C1), 35.51 (s, CH$_2$), 15.38 (s, OCH$_2$CH$_3$). MS (ES) m/z (assignment, relative intensity): 255.2 (C$_{15}$H$_{20}$O$_2$Na, [M+Na]$^+$, 100%). Anal. Calcd. for C$_{15}$H$_{20}$O$_2$: C, 77.54; H, 8.68. Found: C, 77.34; H, 8.76.

Example C

Synthesis of Cyclopentadienyl Acetaldehyde Diethylacetal

Sodium hydride (2.00 g, 60% wt. dispersion in mineral oil, 50.0 mmol) was washed with 40 mL hexanes. Hexanes were decanted and THF (35 mL) was added to the sodium hydride. A solution of 10 mL of freshly cracked cyclopentadiene in 10 mL of THF was slowly added dropwise, releasing heat and gas. This sodium cyclopentadienyl solution was added dropwise to a solution of bromoacetaldehyde diethylacetal (7.8 mL, 9.90 g, 50.0 mmol) in 45 mL THF to give a brown solution and light precipitate. After stirring overnight at 25° C., the mixture was filtered over Celite to remove sodium bromide, and solvent was removed from the filtrate in vacuo to give to a brown oil. To this was added 50 mL of dichloromethane and the mixture was again filtered through Celite. Solvent was removed in vacuo leaving a brown oil. $^1$H NMR data suggests a 1:1 mixture of 1,2- and 1,3-isomers. $^1$H NMR (CDCl3, 600 MHz): δ 6.50 (m, 1H), 6.43 (m, 1H), 6.40 (m, 1H), 6.29 (m, 1H), 6.27 (m, 1H), 6.14 (m, 1H), 4.66 (t, 1H), 4.61 (t, 1H), 3.67 (m, 4H), 3.51 (m, 4H), 2.96 (m, 2H), 2.75 (d, 1H), 2.72 (d, 1H) 1.21 (t, 12H). $^{13}$C{$^1$H} NMR (CDCl$_3$, 150.8 MHz): 144.16 (s), 142.05 (s), 135.01 (s), 133.47 (s), 132.30 (s), 131.54 (s), 128.68 (s), 128.51 (s), 102.72 (s), 102.52 (s), 61.26 (s), 61.08 (s), 44.07 (s), 41.33 (s), 35.24 (s), 34.62 (s), 15.30 (s).

Examples D-H of Ligand Syntheses

Example D

Synthesis of Fluorenyl di(3-methylindolyl)ethane—Compound 1; H$_2$SO$_4$ Catalyzed Fluorenylacetaldehyde diethylacetal (4.00 g, 14.2 mmol) and 3-methylindole (3.72 g, 28.4 mmol) were dissolved in 10 mL of methanol and stirred at 25° C. for 15 minutes. To this solution was added concentrated sulfuric acid (0.200 mL) via syringe. The reaction solution turned dark yellow and was heated at 40-45° C. for 12 hours. The brown reaction mixture was cooled to 25° C. and to this was added 20 mL of methanol. A solution of sodium bicarbonate (20 mL, 1.0 M) was added and the reaction mixture turned cloudy white. Methylene chloride (50 mL) was added and the mixture was extracted with deionized water (3×100 mL). The yellow organic layer was separated and dried over Na$_2$SO$_4$. Solids were removed by filtration. The filtrate was concentrated in vacuo and cooled (−37° C.) overnight. A pale yellow microcrystalline solid was isolated by filtration and washed with cold methylene chloride. X-ray quality crystals were obtained from a toluene/THF mixture. Yield: 3.86 g, 8.53 mmol (60%). $^1$H NMR (CDCl$_3$, 600 MHz): δ 7.69 (s, broad, 2H, NH), 7.66 (d, $^3$J$_{HH}$=7.8 Hz, 2H, indo-H7), 7.47 (d, $^3$J$_{HH}$=7.8 Hz, 2H, flu-H4) 7.43 (d, $^3$J$_{HH}$=7.8 Hz, 2H, indo-H4), 7.26 (t, $^3$J$_{HH}$=7.2 Hz, 2H, indo-H6), 7.21 (d, $^3$J$_{HH}$=7.8 Hz, 2H, flu-H1), 7.19 (t, $^3$J$_{HH}$=7.8 Hz, 2H, flu-H3), 7.12 (t, $^3$J$_{HH}$=7.2 Hz, 2H, flu-H2), 7.07 (t, $^3$J$_{HH}$=7.2 Hz, 2H, indo-H5), 4.75 (t, $^3$J$_{HH}$=7.2 Hz, 1H, CH), 4.00 (t, $^3$J$_{HH}$=7.2 Hz, 1H, flu-CH), 2.72 (dd, 2H, CH$_2$), 2.12 (s, 6H, CH$_3$). $^{13}$C {$^1$H} NMR (CDCl$_3$, 150.8 MHz): 146.30 (s, C1a), 140.95 (s, C4a), 135.35 (s, C7a), 133.93 (s, C3a), 129.48 (s, indo-C2), 127.12 (s, C6), 126.79 (s, flu-C3), 124.00 (s, flu-C4), 121.56 (s, flu-C2), 119.85 (s, C7), 119.34 (s, indo-C5), 118.31 (s, indo-C4), 110.64 (s, flu-C1), 108.20 (s, indo-C3), 45.67 (s, flu-C9), 37.68 (s, CH$_2$), 32.82 (s, CH), 8.74 (s, CH$_3$). MS (ES) m/z (assignment, relative intensity): 491.1 (C$_{33}$H$_{28}$N$_2$K, [M+K]$^+$, 100%). Anal. Calcd. for C$_{33}$H$_{28}$N$_2$·C$_4$H$_8$O: C, 84.93; H, 6.92; N, 5.19. Found: C, 84.68; H, 7.09; N, 5.38.

Example E

Synthesis of Fluorenyl di(3-methylindolyl)ethane—Compound 1; ZrCl$_4$ Catalyzed

Fluorenylacetaldehyde diethylacetal (1.13 g, 4.0 mmol) and 3-methylindole (1.05 g, 8.0 mmol) were dissolved in 15 mL of acetonitrile and the solution was stirred at 25° C. for 15 minutes. To this was added a solution of ZrCl$_4$ (0.100 g, 0.4 mmol) in 10 mL of acetonitrile via cannula. The reaction solution turned brown and was stirred at 25° C. for 12 hours. To this was added 25 mL of deionized water and stirred for 30 min. This brown reaction mixture was extracted with ethyl acetate (3×50 mL). The combined organic portions were dried with Na$_2$SO$_4$, and solids were then removed by filtration. The filtrate was evaporated to dryness and the remaining residue purified by column chromatography (silica gel, 1:4 methylene chloride/hexanes). The resulting yellow residue was dried in vacuo. Spectroscopic data matched that reported in Example D.

Example F

Synthesis of Fluorenyl Dipyrrolylethane—Compound 2

Fluorenylacetaldehyde diethylacetal (1.13 g, 4.0 mmol) was dissolved in 10 mL of acetonitrile, and a solution of pyrrole (1.10 mL, 1.07 g, 16.0 mmol) in 5 mL acetonitrile was added. The resulting solution was stirred at 25° C. for 15 minutes. To this was added via cannula a solution of ZrCl$_4$ (0.100 g, 0.4 mmol) in 10 mL of acetonitrile. The reaction solution turned brown, and was stirred at 25° C. for 12 hours. Deionized water (25 mL) was added and the mixture was stirred for 30 minutes. This brown reaction mixture was then extracted with ethyl acetate (3×50 mL). The combined organic portions were dried with Na$_2$SO$_4$, and solids were then removed by filtration. The brown filtrate was evaporated to dryness and the remaining residue was purified by column chromatography (silica gel, 1:4 methylene chloride/hexanes). The final brown residue was dried in vacuo. Yield: 0.37 g, 1.1 mmol, 28%. $^1$H NMR (CDCl$_3$, 600 MHz): δ 7.74 (d, $^3$J$_{HH}$=7.2 Hz, 2H, flu-H4), 7.63 (s, broad, 2H, NH) 7.43 (d, $^3$J$_{HH}$=7.2 Hz, 2H, flu-H1), 7.34 (t, $^3$J$_{HH}$=7.2 Hz, 2H, flu-H3), 7.26 (t, $^3$J$_{HH}$=7.2 Hz, 2H, flu-H2), 6.57 (q, 2H, pyrr-H5), 6.12 (q, 2H, pyrr-H4), 6.09 (m, broad, 2H, pyrr-H3), 4.38 (t, $^3$J$_{HH}$=7.8 Hz, 1H, CH), 3.90 (t, $^3$J$_{HH}$=6.6 Hz, 1H, flu-CH), 2.44 (t, $^3$J$_{HH}$=7.8 Hz, 2H, CH$_2$). $^{13}$C{$^1$H} NMR (CDCl$_3$, 150.8 MHz): 147.40 (s, C1a), 140.78 (s, C4a), 132.77 (s, pyrr-C2), 126.97 (s, flu-C3), 126.83 (s, flu-C2), 124.50 (s, flu-C1), 119.84 (s, flu-C4), 117.35 (s, pyrr-C5), 108.16 (s, pyrr-C4), 105.94 (s, pyrr-C3), 45.24 (s, flu-C9), 39.34 (s, $CH_2$), 35.93 (s, CH). MS (ES) m/z (assignment, relative intensity): 346.8 ($C_{23}H_{20}N_2Na$, [M+Na]$^+$, 100%). Anal. Calcd. for $C_{23}H_{20}N_2$: C, 85.15; H, 6.21; N, 8.64. Found: C, 84.22; H, 6.42; N, 7.86.

Example G

Synthesis of Indenyl di(3-methylindolyl)ethane—Compound 3; $H_3IDI$

Indenyl acetaldehyde diethylacetal (0.938 g, 4.0 mmol) and 3-methylindole (1.05 g, 8.0 mmol) were dissolved in 15 mL of acetonitrile. To this was added a solution of $ZrCl_4$ (0.095 g, 0.4 mmol) in 10 mL of acetonitrile to give a dark brown mixture which was stirred at 25° C. overnight. Deionized water (20 mL) was added followed by stirring for 30 minutes. The mixture was extracted with ethyl acetate (3×50 mL). The combined organic portions were dried with $Na_2SO_4$, solids were then removed by filtration, and the solvent was removed from the filtrate via rotary evaporation. The resulting brown residue was dissolved in a minimal amount of a 1:1 mixture of methylene chloride and hexanes and purified by column chromatography (silica gel, 1:4 methylene chloride/hexanes) to yield a yellow solid. Yield: 1.085 g, 2.7 mmol (67%). $^1H$ NMR ($CDCl_3$, 600 MHz): δ 7.85 (s, broad, 1H, NH), δ 7.79 (s, broad, 1H, NH) δ 7.53 (d, $^3J_{HH}$=7.8 Hz, 2H, indo-H7), 7.49 (d, $^3J_{HH}$=7.8 Hz, 2H, inde-H7) 7.39 (d, $^3J_{HH}$=7.2 Hz, 2H, inde-H4), 7.34 (d, $^3J_{HH}$=7.2 Hz, 2H, indo-H4), 7.28 (d, $^3J_{HH}$=7.8 Hz, 2H, indo-H4), 7.24 (t, $^3J_{HH}$=7.2 Hz, 1H, indo-H6), 7.23 (d, $^3J_{HH}$=7.2 Hz, 2H, inde-H7), 7.16 (t, $^3J_{HH}$=7.2 Hz, 1H, indo-H5), 7.15 (t, $^3J_{HH}$=7.2 Hz, 1H, indo-H6), 7.13 (t, $^3J_{HH}$=7.2 Hz, 1H, indo-H5), 7.12 (t, $^3J_{HH}$=7.2 Hz, 1H, inde-H5), 7.09 (t, $^3J_{HH}$=7.2 Hz, 1H, inde-H6), 6.75 (dd, 1H, inde-H2), 6.39 (dd, 1H, inde-H3), 4.76 (dd, 1H, CH), 3.44 (m, 1H, inde-H1), 2.74 (m, 1H, $CH_2$), 2.33 (s, 3H, $CH_3$), 2.23 (s, 3H, $CH_3$), 2.18 (m, 1H, $CH_2$). $^{13}C\{^1H\}$NMR ($CDCl_3$, 150.8 MHz): 147.01 (s, inde-C7a), 144.04 (s, inde-C3a), 137.75 (s, inde-C3), 135.53 (s, indo-C7a), 135.19 (s, indo-C7a), 134.38 (s, indo-C3a), 134.04 (s, indo-C3a), 131.61 (s, inde-C2), 129.60 (s, indo-C2), 129.44 (s, indo-C2), 126.82 (s, inde-C7), 124.93 (s, indo-C5), 122.69 (s, inde-C4), 121.79 (s, indo-C5), 121.63 (s, indo-C6), 121.26 (s, indo-C4), 119.47 (s, inde-C6), 118.50 (s, inde-C7), 118.36 (s, indo-C7), 110.73 (s, inde-C4), 110.68 (s, indo-C6), 110.68 (s, inde-C5), 108.56 (s, indo-C3), 107.98 (s, indo-C3), 48.61 (s, inde-C1), 36.24 (s, $CH_2$), 34.36 (s, CH), 8.96 (s, $CH_3$), 8.80 (s, $CH_3$). MS (ES) m/z (assignment, relative intensity): 441.0 ($C_{29}H_{26}N_2K$, [M+K]$^+$, 100%).

Example H

Synthesis of Indenyl Dipyrrolylethane—Compound 4

Indenylacetaldehyde diethylacetal (0.93 g, 4.0 mmol) and pyrrole (1.10 mL, 1.07 g, 16.0 mmol) were dissolved in 15 mL of acetonitrile and stirred at 25° C. for 15 minutes. To this was added a solution of $ZrCl_4$ (0.100 g, 0.4 mmol) in 10 mL acetonitrile to give a brown solution which was stirred at 25° C. for 12 hours. Deionized water (25 mL) was added, followed by stirring for 30 minutes. The brown mixture was extracted with ethyl acetate (3×50 mL). The combined organic portions were dried with $Na_2SO_4$. Solids were removed by filtration, and the solvent was removed from the filtrate via rotary evaporation. The remaining residue was purified by column chromatography (silica gel, 1:4 methylene chloride/hexanes) to yield a white solid. $^1H$ NMR ($CDCl_3$, 600 MHz): δ 7.66 (s, broad, 1H, NH), δ 7.60 (s, broad, 1H, NH) δ 7.38 (d, $^3J_{HH}$=7.8 Hz, 1H), 7.33 (d, $^3J_{HH}$=7.8 Hz, 1H) 7.24 (t, 1H), 7.17 (t, 1H), 6.75 (d, 1H), 6.61 (m, 1H), 6.56 (m, 1H), 6.31 (d, 1H), 6.16 (m, 1H), 6.14 (m, 1H), 6.08 (m, 1H), 4.22 (dd, 1H), 3.38 (m, 1H), 2.47 (m, 1H), 1.97 (m, 1H).

Example of Metal Complexes of Group IV B

Example I

Synthesis of (IDI)Zr(NEt$_2$)

A solution of Zr(NEt$_2$)$_4$ (0.141 g, 0.38 mmol) in 10 mL of toluene was added via cannula to a solution of indenyl di(3-methylindolyl)ethane (0.150 g, 0.38 mmol) in 15 mL of toluene. The resulting brown reaction mixture was heated for 1 hour, then cooled to room temperature, and stirred overnight. Volatiles were removed from the mixture in vacuo to leave a brown residue. The residue was dissolved in a minimal amount of hot toluene and cooled (−37° C.) overnight. Pale yellow crystals were isolated by decantation and dried in vacuo. X-Ray quality crystals were obtained by recrystallization from hot toluene. Yield: 0.110 g, 0.205 mmol, 55%. $^1H$ NMR ($CDCl_3$, 600 MHz): δ 7.85 (d, $^3J_{HH}$=7.8 Hz, 1H, indo-H7), 7.44 (m, 1H, inde-H4), 7.40 (d, $^3J_{HH}$=7.8 Hz, 1H, indo-H4), 7.07 (m, 2H, indo-H4, indo-H6), 7.02 (m, 2H, indo-H5, inde-H5), 6.93 (t, $^3J_{HH}$=7.2 Hz, 1H, indo-H6), 6.85 (d, $^3J_{HH}$=3.6 Hz, 1H, inde-H2), 6.81 (t, $^3J_{HH}$=7.2 Hz, 1H, inde-H6), 6.58 (t, $^3J_{HH}$=7.2 Hz, 1H, indo-H5), 6.46 (d, $^3J_{HH}$=8.4 Hz, 1H, indo-H7), 6.23 (d, $^3J_{HH}$=7.8 Hz, 1H, inde-H7), 6.13 (d, $^3J_{HH}$=3.6 Hz, 1H, inde-H3), 5.35 (dd, 1H, CH), 3.90 (m, 4H, NCH$_2$CH$_3$), 3.58 (dd, $^2J_{HH}$=13.2 Hz, $^3J_{HH}$=3.6 Hz, 1H, CH$_2$), 3.37 (dd, $^2J_{HH}$=13.2 Hz, $^3J_{HH}$=3.6 Hz, 1H, CH$_2$), 2.45 (s, 3H, CH$_3$), 2.44 (s, 3H, CH$_3$), 1.24 (t, $^3J_{HH}$=6.6 Hz, 6H, NCH$_2$CH$_3$). $^{13}C\{^1H\}$ NMR (CDCl$_3$, 150.8 MHz): 145.81 (s, indo-C7a), 144.93 (s, indo-C7a), 142.21 (s, inde-C3a), 141.98 (s, inde-C$_1$a), 137.86 (s, inde-C3a), 131.00 (s, indo-C3a), 130.58 (s, indo-C3a), 126.78 (s, inde-C7a), 124.71 (s, indo-C6), 124.27 (s, indo-C5), 122.10 (s, indo-C7), 121.77 (s, inde-C3), 121.73 (s, indo-C7), 120.57 (s, indo-C5), 120.18 (s, inde-C6), 119.25 (s, inde-C5), 118.44 (s, indo-C6), 117.92 (s, inde-C4), 117.79 (s, indo-C4), 114.29 (s, indo-C4), 113.56 (s, inde-C7), 99.65 (s, inde-C2), 40.67 (s, NCH$_2$CH$_3$), 36.42 (s, CH), 34.82 (s, inde-C1), 15.85 (s, NCH$_2$CH$_3$), 9.14 (s, CH$_3$), 9.06 (s, CH$_3$).

Figure 10A:
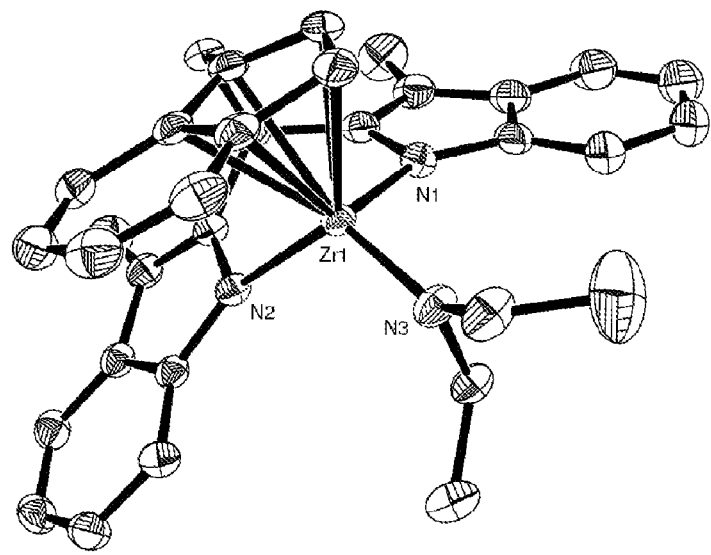
FIGS. 10A-10C are schematic illustrations of the molecular structure of $(IDI)Zr(NEt_2)$ of Example "I" as experimentally determined by X-ray crystallography.
Figure 10B:
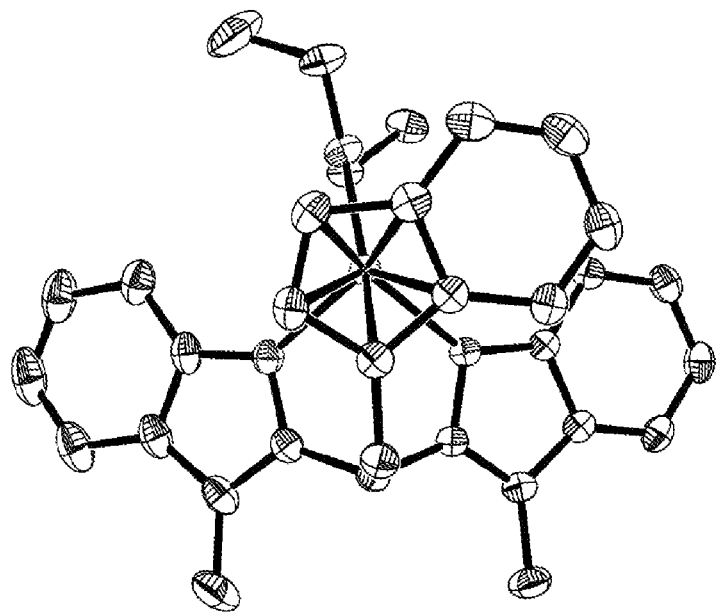
Figure 10C:
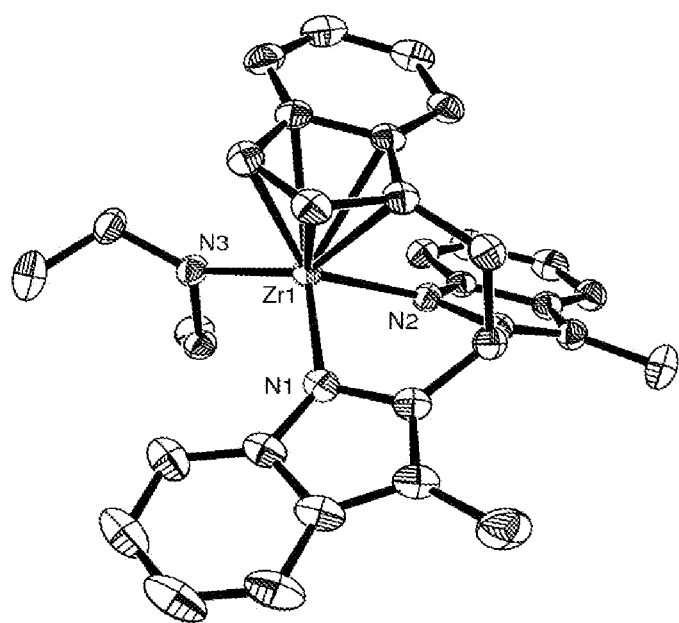

FIGS. 10A-10C are ORTEP diagrams of the molecular structure of (IDI)Zr(NEt$_2$). Crystals of (IDI)Zr(NEt$_2$) were grown from a concentrated toluene solution at −30° C. and analyzed by X-ray crystallography by Drs. Ryan Rondo and Kristin Kirschbaum at The University of Toledo. Crystallographic analysis confirms the coordination of both indolyl moieties as well as the η$^5$-coordination of the indenyl moiety, and confirms the structure of (IDI)Zr(NEt$_2$) as proposed by NMR methods. There is one amido moiety bound to the zirconium metal center. The zirconium-amido bond distance for Zr(1)-N(3) is 2.0060 (17) Å. This bond distance is relatively short, and a trigonal planar geometry of the amido nitrogen suggests π-donation of the nitrogen lone pair to the metal center. The sum of the angles around N3 of the amido moiety is 359.81°. Zirconium-indolyl bond distances for Zr(1)-N(1) and Zr(1)-N(2) are 2.1109 (17) Å and 2.1597 (16) Å, respectively, and are in the range of reported zirconium-indolyl distances (2.19-2.21 Å). The elongated metal-indolyl bond distance is a result of delocalization of the nitrogen lone pair into the aromatic ring, and reduced N→M donation. The average zirconium-carbon distance for Zr(1)-C(3), Zr(1)-C4, Zr(1)-C(5), Zr(1)-C(30), and Zr(1)-C(35) of the indenyl five-membered ring is 2.4891 (38) Å, and is comparable to that of other known indenylzirconium CGCs (2.5303 (17) Å). Crystal data for (IDI)Zr(NEt$_2$).toluene: C$_{36.5}$H$_{37}$N$_3$Zr, formula weight=608.9, tetragonal, space group I4$_1$/a, a=22.1251 (18) Å, b=22.1251(18) Å, c=24.479(3) Å, α=β=γ=90.0°, V=11982.7(19) Å$^3$, Z=16.

Examples of uses of Trianionic Ligand Precursor Compounds

Example J

Examples of Metal Complexes

Synthesis of (FDI)Zr(CH$_3$)

Fluorenyl di(3-methylindolyl)ethane (0.500 g, 1.10 mmol) was dissolved in 15 mL of diethyl ether and cooled to −78° C. A solution of MeLi in diethyl ether (2.8 mL, 1.6 M, 4.4 mmol) was added dropwise via syringe. Upon warming to room temperature, the red solution was stirred for 12 h. The reaction mixture was cooled to −78° C., and ZrCl$_4$(THF)$_2$ (0.420 g, 1.10 mmol) was added as a solid. The reaction mixture was warmed to room temperature and stirred for 3 h. Volatiles were removed in vacuo, and 20 mL of methylene chloride were added. The cloudy orange reaction mixture was filtered through Celite, and volatiles were removed in vacuo, leaving an orange/red solid. Yield: 0.424 g, 0.605 mmol, 55%. $^1$H NMR (CDCl$_3$, 600 MHz): δ 7.97 (d, $^3J_{HH}$=8.4 Hz, 2H, flu-H4), 7.44 (d, $^3J_{HH}$=7.8 Hz, 2H, indo-H4), 7.27 (d, $^3J_{HH}$=8.4 Hz, 2H, flu-H1) 7.18 (t, $^3J_{HH}$=7.2 Hz, 2H, flu-H3), 6.97 (t, $^3J_{HH}$=7.2 Hz, 2H, indo-H5), 6.86 (t, $^3J_{HH}$=7.2 Hz, 2H, indo-H6), 6.65 (t, $^3J_{HH}$=7.2 Hz, 2H, flu-H2), 6.27 (d, $^3J_{HH}$=8.4 Hz, 2H, indo-H7), 5.20 (t, $^3J_{HH}$=6.6 Hz, 1H, CH), 3.64 (d, $^3J_{HH}$=3.6 Hz, 1H, CH$_2$), 3.42 (m, br, 4H, THF), 3.10 (q, br, 4H, Et$_2$O), 2.55 (s, 2H, CH$_3$), 1.55 (m, br, 4H, THF), 1.16 (t, br, 6H, Et$_2$O), −0.42 (s, 3H, Zr—CH$_3$). $^{13}$C{$^1$H} NMR (CDCl$_3$, 150.8 MHz): 145.11 (s, indo-C3a), 132.46 (s, indo-C7a), 128.18 (s, flu-C4a), 127.04 (s, flu-C2), 124.39 (s, flu-C4), 121.59 (s, flu-C3), 119.68 (s, indo-C7), 119.58 (s, flu-C4a), 119.21 (s, indo-C6), 117.91 (s, indo-C5), 116.68 (s, indo-C4), 116.43 (s, flu-C1), 105.37 (s, indo-C2), 93.77 (s, indo-C3), 89.26 (s, flu-CH), 68.00 (s, THF), 65.82 (s, Et$_2$O), 50.75 (s, Zr—CH$_3$), 38.02 (s, CH), 34.39 (s, CH$_2$), 25.13 (s, THF), 15.20 (s, Et$_2$O), 15.13 (s, C16), 9.48 (s, CH$_3$).

Synthesis of (FDI)Ti(CH$_3$)

Fluorenyl di(3-methylindolyl)ethane (0.200 g, 0.440 mmol) was dissolved in 15 mL of diethyl ether and cooled to −78° C. A solution of MeLi in diethyl ether (1.1 mL, 1.6 M, 1.8 mmol) was added dropwise via syringe. Upon warming to room temperature, the red solution was stirred for 12 h. The reaction mixture was cooled to −78° C., and TiCl$_4$(THF)$_2$ (0.150 g, 0.440 mmol) was added as a solid. The reaction mixture was warmed to room temperature and stirred for 3 h. The reaction mixture was filtered over Celite, and volatiles were removed in vacuo from the filtrate, resulting in a brown residue. Yield: 0.082 g, 0.16 mmol, 36%. $^1$H NMR (CDCl$_3$, 400 MHz): δ 8.23 (d, $^3J_{HH}$=8.8 Hz, 2H, flu-H4), 7.27 (d, $^3J_{HH}$=8.0 Hz, 2H, indo-H4), 7.17 (t, $^3J_{HH}$=7.2 Hz, 2H, flu-H3), 6.92 (t, $^3J_{HH}$=7.2 Hz, 2H, indo-H5), 6.84 (t, $^3J_{HH}$=7.2 Hz, 2H, indo-H6), 6.78 (t, $^3J_{HH}$=7.2 Hz, 2H, flu-H2), 6.67 (d, $^3J_{HH}$=8.8 Hz, 2H, flu-H1), 6.27 (d, $^3J_{HH}$=8.0 Hz, 2H, indo-H7), 5.26 (t, $^3J_{HH}$=6.6 Hz, 1H, CH), 3.75 (d, $^3J_{HH}$=3.6 Hz, 2H, CH$_2$), 3.48 (m, br, 4H, THF), 3.46 (q, 4H, Et$_2$O), 2.44 (s, 6H, indole-CH$_3$), 1.69 (m, br, 4H, THF), 1.19 (t, $^3J_{HH}$=7.2 Hz, 6H, Et$_2$O), 0.30 (s, 3H, Ti—CH$_3$).

Synthesis of ($^t$BuN═)Nb(IDI)(py)

Indenyl di(3-methylindolyl)ethane (0.300 g, 0.745 mmol) was dissolved in 25 mL of diethyl ether and cooled to −78° C. A solution of MeLi in diethyl ether (1.4 mL, 1.6 M, 2.2 mmol) was added dropwise via syringe. The cloudy orange/red mixture was warmed to room temperature and stirred for 12 h. This mixture was again cooled to −78° C. and added in portions via cannula to a cooled (−78° C.) solution of ($^t$BuN)NbCl$_3$(py)$_2$ (0.320 g, 0.745 mmol) in 10 mL of toluene. The resulting purple reaction mixture was warmed to room temperature and stirred for 12 h. Volatiles were removed in vacuo, and 25 mL of methylene chloride were added. This cloudy purple reaction mixture was filtered through Celite, and volatiles were removed in vacuo from the filtrate, leaving a purple solid. Yield: 0.375 g, 0.596 mmol, 80%. $^1$H NMR (CDCl$_3$, 600 MHz): δ 7.90 (d, $^3J_{HH}$=7.8 Hz, 1H, indo-H4), 7.58 (d, $^3J_{HH}$=7.8 Hz, 1H, inde-H4), 7.38 (d, $^3J_{HH}$=7.2 Hz, 1H, indo-H4) 7.32 (d, $^3J_{HH}$=7.2 Hz, 1H, indo-H7), 7.26 (t, $^3J_{HH}$=7.8 Hz, 1H, indo-H5), 7.16 (d, $^3J_{HH}$=7.2 Hz, 1H, indo-H5), 7.12 (t, $^3J_{HH}$=7.8 Hz, 1H, inde-H5), 7.08 (t, $^3J_{HH}$=7.8 Hz, 1H, indo-H6), 6.98 (d, $^3J_{HH}$=3.0 Hz, 1H, inde-H2), 6.96 (t, $^3J_{HH}$=7.8 Hz, 1H, indo-H6), 6.89 (t, $^3J_{HH}$=7.8 Hz, 1H, inde-H6), 6.67 (d, $^3J_{HH}$=7.8 Hz, 1H, inde-H7), 6.52 (m, br, 1H, indo-H7), 6.03 (d, $^3J_{HH}$=7.8 Hz, 1H, indo-H3), 5.32 (dd, 1H, CH), 3.48 (dd, $^2J_{HH}$=13.2 Hz, $^3J_{HH}$=3.6 Hz, 1H, CH$_2$), 3.20 (dd, $^2J_{HH}$=13.2 Hz, $^3J_{HH}$=3.6 Hz, 1H, CH$_2$), 2.44 (s, 3H, CH$_3$), 2.41 (s, 3H, CH$_3$), 1.53 (s, 9H, N—C(CH$_3$)$_3$). $^{13}$C{$^1$H} NMR (CDCl$_3$, 150.8 MHz): 149.59 (s, br, py), 145.45 (s, indo-C7a), 144.77 (s, indo-C7a), 143.02 (s, inde-C3a), 141.56 (s, inde-C7a), 136.48 (s, br, py), 130.80 (s, inde-C1), 130.22 (s, indo-C3a), 129.41 (s, indo-C3a), 125.85 (s, indo-C7), 124.36 (s, indo-C4), 123.86 (s, indo-C5), 123.82 (s, py), 121.64 (s, inde-C6), 121.16 (s, indo-C6), 120.66 (s, inde-C3), 120.60 (s, indo-C5), 120.23 (s, indo-C6), 119.50 (s, inde-C5), 118.37 (s, indo-C2), 117.48 (s, indo-C7), 117.18 (s, indo-C4), 115.63 (s, inde-C4), 115.13 (s, inde-C7), 111.28 (s, indo-C2), 109.35 (s, indo-C3), 109.26 (s, indo-C3), 90.44 (s, inde-C2), 38.23 (s, CH), 33.64 (s, CH$_2$), 33.27 (s, N—C(CH$_3$)$_3$), 32.84 (s, N—C(CH$_3$)$_3$), 9.32 (s, CH$_3$), 9.21 (s, CH$_3$).

Synthesis of (PhN═)Nb(IDI)

Indenyl di(3-methylindolyl)ethane (0.200 g, 0.497 mmol) was dissolved in 15 mL of diethyl ether and cooled to −78° C. A solution of MeLi in diethyl ether (0.90 mL, 1.6 M, 1.5 mmol) was added dropwise via syringe. The cloudy orange/red reaction mixture was warmed to room temperature and stirred for 12 h. This mixture was again cooled to −78° C., and added in portions via cannula to a cooled (−78° C.) solution of (PhN)NbCl$_3$(dme) (0.230 g, 0.497 mmol) in 15 mL of toluene. The resulting dark red reaction mixture was warmed to room temperature and stirred for 12 h. The resulting cloudy dark red reaction mixture was filtered through Celite, and volatiles were removed in vacuo from the filtrate, leaving a dark red solid. $^1$H NMR (CDCl$_3$, 600 MHz): δ 7.78 (d, $^3J_{HH}$=8.4 Hz, 1H, indo-H7), 7.52 (m, br, 2H, indo-H4), 7.38 (t, $^3J_{HH}$=7.2 Hz, 2H, indo-H6, inde-H5) 7.33 (m, br, 3H, indo-H6, inde-H6, aryl-H1), 7.27 (m, br, 3H, indo-H7, Inde-H4, aryl-H1), 7.19 (m, br, 1H, inde-H7), 7.16 (m, br, 1H, indo-H5), 7.11 (m, br, 1H, indo-H5), 7.03 (d, $^3J_{HH}$=3.6 Hz, 1H, inde-H2), 6.98 (m, 1H, aryl-H2), 6.88 (m, 1H, aryl-H3), 6.59 (m, 1H, aryl-H2), 6.16 (d, $^3J_{HH}$=3.6 Hz, 1H, inde-H3), 5.32 (dd, 1H, CH), 3.56 (dd, 1H, $CH_2$), 3.30 (dd, 1H $CH_2$), 2.47 (s, 3H, $CH_3$), 2.45 (s, 3H, $CH_3$).

Various industrial processes, such as gas phase polymerization of alkenes, utilize heterogeneous catalysts for ease of product separation and to avoid the use, separation, and recycle of reaction solvent.

Also within the contemplated scope of the present invention are uses of homogeneous trianionic ligand catalysts described herein which can be supported on an inert material to provide heterogeneous versions of useful catalysts.

The methods, compounds, and processes, of the present invention can be used in the polymerization of alkenes (olefins) and for various other applications.

The trianionic ligands are useful in processes for polymerizing a monomer in the presence of a trianionic ligand catalyst, having a Group 4, 5 or 6 metal or metal complex. In certain embodiments, the trianionic ligand precursor compound can have the general structure of the compounds: 1, 1a, 1b, 2, 2a, 2b, 3, 3a, 3b, 4, 4a, 4b, 5a, 5b, 6a or 6b.

In certain non-limiting embodiments, the monomer can be one or more of: ethylene, propylene, 1-butene, 1-pentene, 1-hexene, 1-octene, 4-methyl-1-pentene, and mixtures thereof.

Examples of Methods of Making and/or using Heterogeneous Supported Trianionic Ligand Catalysts

Example

Route A

In another aspect, there is provided herein a method for making a heterogeneous supported catalyst for polymerization of alkenes. The method generally includes providing a metal complex of the catalyst system, an activator, and an inert support capable of being combined and stirred in a mixture with an unreactive hydrocarbon solvent. Subsequently, the solvent is removed to yield the supported catalyst. In one embodiment, the solvent can be removed by vacuum distillation.

Non-limiting examples of suitable activators include aluminum alkyl, organoboron reagent, and aluminoxane. In certain embodiments, the activator is selected from one or more of: alumoxanes, alkyl aluminums, alkyl aluminum halides, anionic compounds of boron or aluminum, trialkylboron and triarylboron compounds, and mixtures thereof.

Non-limiting examples of inert support surfaces include silica, alumina, aluminophosphate, aluminosilicate, magnesia, and titania.

Non-limiting examples of unreactive hydrocarbon solvents include toluene and hexane.

Example

Route B

In another broad aspect, there is provided herein a method for making a heterogeneous supported catalyst for polymerization of alkenes. The method generally includes providing a trianionic ligand catalyst having a metal (or metal complex) and a substituted trianionic ligand moiety where at least one substituents includes one or more groups capable of binding to an inert support surface.

The substituted trianionic ligand catalyst is combined with an activator, an inert support, and an unreactive hydrocarbon solvent. The solvent is then removed to yield the supported catalyst.

In one embodiment, where at least one of the R, R', and R" substituent groups in the substituted trianionic ligand is a $CH_2(CH_2)_nSi(OEt)_3$ group, the metal complex can be covalently attached to the inert support by reaction of surface hydroxyl groups with the Si—OEt groups and formation of support O—Si linkages and ethanol. It is to be understood that various methods for grafting molecular compounds to surfaces are within the contemplated scope of the present invention.

Definitions

As used in the specification and claims, the singular form "a", "an" and "the" includes plural references unless the context clearly dictates otherwise. For example, the term "a compound" includes a plurality of compounds, including mixtures thereof.

The term "mixing" is defined as mixing the two components, and any additional optional components, together. Depending upon the properties of the components to be mixed, there may or may not be a significant chemical or physical interaction between two or more components when they are mixed. For example, if one component is an acid, and the other component is a base, upon mixing, the two components may, depending on the strength of the acids and bases, react to form a salt comprising the anion corresponding to the acid and the protonated cation corresponding to the base, or an equilibrium mixture of the original acids and bases, and their salts. In such cases, it will be understood by those of ordinary skill in the art that the resulting compound may be claimed in terms of the components known to be present after the admixing process, or alternatively may be claimed in terms of the components admixed in a product-by-process claim format, especially if the exact nature of the product resulting from the process of admixing the components is unknown or only poorly known or understood.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

What is claimed is:

1. A compound of the Formula A or the triply deprotonated Formula A' having the following structures:

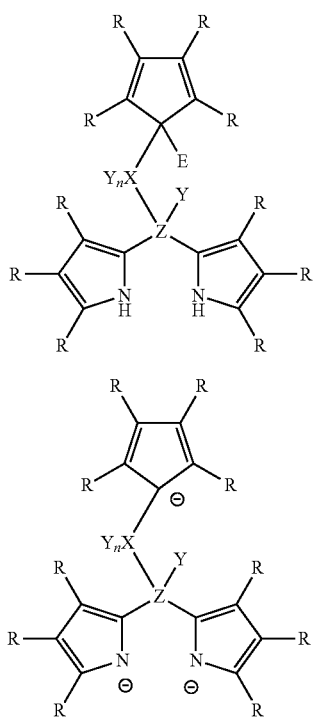

Formula A

Formula A' and stereoisomers, solvates and hydrates thereof, wherein
R is selected from the group consisting of hydrogen, halogen, alkyl, alkenyl, alkynyl, cycloalkyl, cycloalkenyl, substituted alkyl, substituted alkenyl, substituted alkynyl, substituted cycloalkyl, substituted cycloalkenyl, aryl, heteroaryl silyl, heterosilyl, and heterocyclic; or R is combined with at least one other R to form one or two $C_3$, $C_4$, $C_5$ or $C_6$ aliphatic or aromatic fused ring or rings, wherein when two fused rings are present, the number of carbons in each ring may be the same or different from each other;

X is an element selected from the group consisting of: a Group 13 element, a Group 14 element; a Group 15 element; and a Group 16 element; wherein n=0, 1, 2;

Y is selected from the group consisting of hydrogen, halogen, alkyl, alkenyl, alkynyl, cycloalkyl, cycloalkenyl, substituted alkyl, substituted alkenyl, substituted alkynyl, substituted cycloalkyl, substituted cycloalkenyl, aryl, heteroaryl silyl, heterosilyl, and heterocyclic;

Z is an element selected from the group consisting of: a Group 13 element; a Group 14 element; and a Group 15 element; wherein when Z is a Group 13 or 15 element, Y is absent;

E is selected from the group consisting of H, D, halogen, and substituted silicon.

2. A compound of claim 1, wherein X and Z are selected from the group consisting of: carbon, silicon, phosphorous, germanium and tin.

3. A compound of claim 1, wherein
R is H; or R is combined with at least one other R to form one or two $C_3$, $C_4$, $C_5$ or $C_6$ aliphatic or aromatic fused ring or rings, wherein when two fused rings are present, the number of carbons in each ring may be the same or different from each other;
X and Z are carbon or silicon;
Y and E are H.

4. A compound of claim 1, wherein the compound is comprised of at least one of: a cyclopentadienyl ring, a fluorenyl ring, or an indenyl ring bridged to at least one of a dipyrrolyl group or diindolyl group.

5. A compound of claim 4, wherein one or more of the cyclopentadienyl ring, the fluorenyl ring, the indenyl ring, the dipyrrolyl group and the diindolyl group are substituted.

6. A compound of claim 4, wherein pendent groups containing two pyrrolyl or indolyl donors are bound to Z.

7. A metal complex comprising:
a compound of claim 1;
an $\eta^5$ coordination of one or more of: a cyclopentadienyl ring, an indenyl ring and a fluorenyl ring; and
an $\eta^1$ coordination of each of two pyrrolyl or indolyl groups,
wherein the metal complex has the following structure:

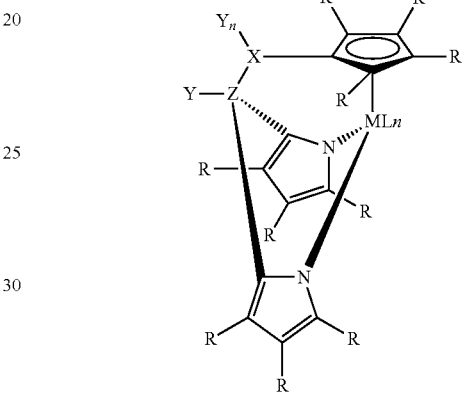

wherein M is a Group 4, 5, or 6 metal; L is alkyl, substituted alkyl, alkylene, alkaryl, alkoxy, substituted alkoxy, alkenyl, substituted alkenyl, alkenylene, substituted alkenylene, alkynyl, substituted alkynyl, aryl, aryloxy, carboxyalkyl, cycloalkyl, substituted cycloalkyl, cycloalkenyl, substituted cycloalkenyl, halogen, heteroaryl, or heterocyclic; and n is either 1, 2, or 3; provided that when M is a Group 6 metal, n is 3.

8. A compound of claim 1, comprising the Formula B:

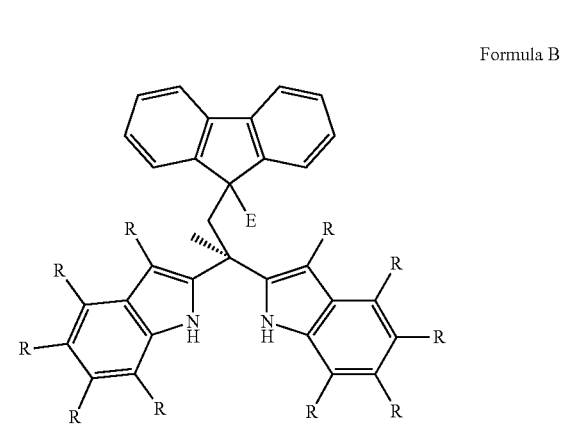

Formula B and stereoisomers, solvates and hydrates thereof, wherein
R is selected from the group consisting of hydrogen, alkyl, aryl and heterocycle;
E is selected from the group consisting of hydrogen, D and $SiMe_3$.

9. A compound of claim 1, comprising the Formula C:

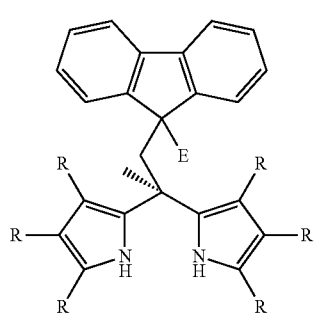

Formula C and stereoisomers, solvates and hydrates thereof, wherein
R is selected from the group consisting of hydrogen, alkyl, aryl and heterocycle;
E is selected from the group consisting of hydrogen, D and SiMe$_3$.

10. A compound of claim 1, having the Formula D:

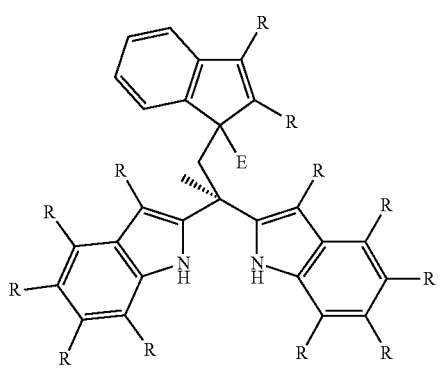

Formula D and stereoisomers, solvates and hydrates thereof, wherein
R is selected from the group consisting of hydrogen, alkyl, aryl and heterocycle;
E is selected from the group consisting of hydrogen, D and SiMe$_3$.

11. A compound of claim 1, comprising the Formula E:

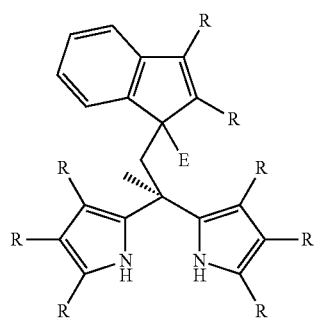

Formula E and stereoisomers, solvates and hydrates thereof, wherein
R is selected from the group consisting of hydrogen, alkyl, aryl and heterocycle;
E is selected from the group consisting of hydrogen, D and SiMe$_3$.

12. A compound of claim 1, comprising the Formula F:

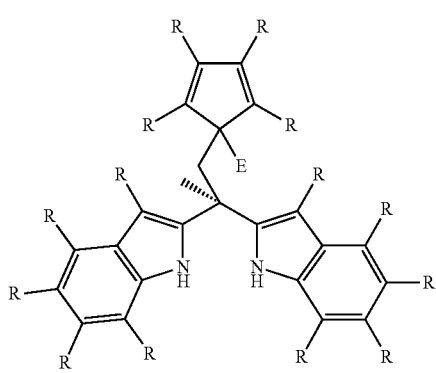

Formula F and stereoisomers, solvates and hydrates thereof, wherein
R is selected from the group consisting of hydrogen, alkyl, aryl and heterocycle;
E is selected from the group consisting of hydrogen, D and SiMe$_3$.

13. A compound of claim 1, comprising the Formula G:

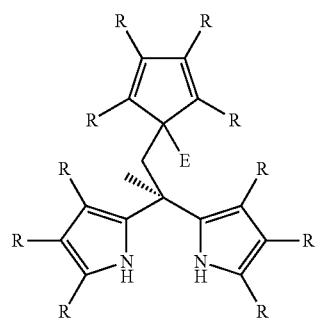

Formula G and stereoisomers, solvates and hydrates thereof, wherein
R is selected from the group consisting of hydrogen, alkyl, aryl and heterocycle;
E is selected from the group consisting of hydrogen, D and SiMe$_3$.

14. A compound of claim 1, comprising the Formula H:

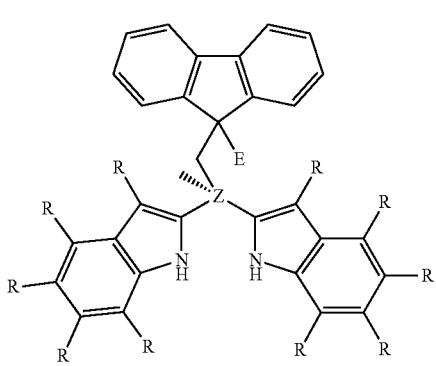

Formula H and stereoisomers, solvates and hydrates thereof, wherein
R is selected from the group consisting of hydrogen, alkyl, aryl and heterocycle;

Z is selected from the group consisting of a Group 13, 14, and 15 element;

E is selected from the group consisting of hydrogen, D and SiMe$_3$.

15. A compound of claim 1, comprising the Formula J:

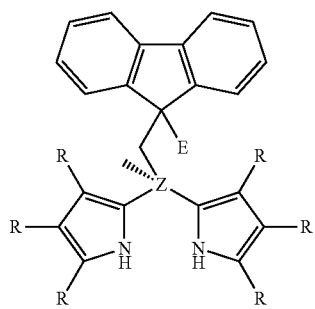

Formula J and stereoisomers, solvates and hydrates thereof, wherein

R is selected from the group consisting of hydrogen, alkyl, aryl and heterocycle;

Z is selected from the group consisting of a Group 13, 14, and 15 element;

E is selected from the group consisting of hydrogen, D and SiMe$_3$.

16. A compound of claim 15, wherein Z is selected from the group consisting of carbon and silicon; and E is hydrogen.

17. A compound of claim 1, comprising the Formula K:

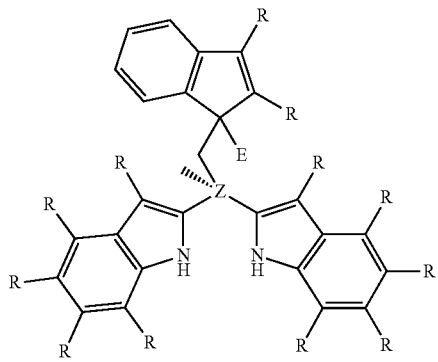

Formula K and stereoisomers, solvates and hydrates thereof, wherein

R is selected from the group consisting of hydrogen, alkyl, aryl and heterocycle;

Z is selected from the group consisting of a Group 13, 14, and 15 element;

E is selected from the group consisting of hydrogen, D and SiMe$_3$.

18. A compound of claim 17, wherein Z is selected from the group consisting of carbon and silicon; and E is hydrogen.

19. A compound of claim 1, comprising the Formula L:

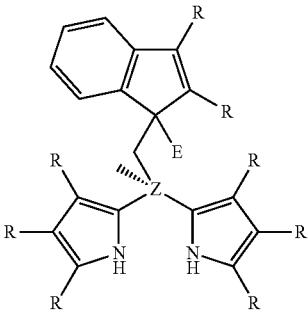

Formula L and stereoisomers, solvates and hydrates thereof, wherein

R is selected from the group consisting of hydrogen, alkyl, aryl and heterocycle;

Z is selected from the group consisting of a Group 13, 14, and 15 element;

E is selected from the group consisting of hydrogen, D and SiMe$_3$.

20. A compound of claim 19, wherein Z is selected from the group consisting of carbon and silicon; and E is hydrogen.

21. A compound of claim 1, comprising the Formula M:

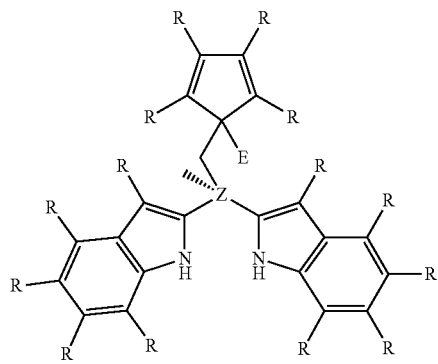

Formula M and stereoisomers, solvates and hydrates thereof, wherein

R is selected from the group consisting of hydrogen, alkyl, aryl and heterocycle;

Z is selected from the group consisting of a Group 13, 14, and 15 element;

E is selected from the group consisting of hydrogen, D and SiMe$_3$.

22. A compound of claim 21, wherein Z is selected from the group consisting of: carbon and silicon; and E is hydrogen.

23. A compound of claim 1, comprising the Formula N:

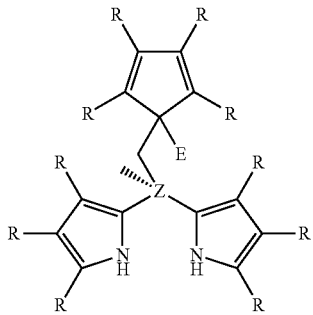

Formula N and stereoisomers, solvates and hydrates thereof, wherein

R is selected from the group consisting of hydrogen, alkyl, aryl and heterocycle;

Z is selected from the group consisting of a Group 13, 14, and 15 element;

E is selected from the group consisting of hydrogen, D and SiMe$_3$.

24. A compound of claim 23, wherein Z is selected from the group consisting of carbon and silicon; and E is hydrogen.

25. A constrained geometry catalyst (CGC) comprising a compound of claim 1 coordinated to a metal having the following structure:

wherein M is a Group 4, 5, or 6 metal; L is alkyl, substituted alkyl, alkylene, alkaryl, alkoxy, substituted alkoxy, alkenyl, substituted alkenyl, alkenylene, substituted alkenylene, alkynyl, substituted alkynyl, aryl, aryloxy, carboxyalkyl, cycloalkyl, substituted cycloalkyl, cycloalkenyl, substituted cycloalkenyl, halogen, heteroaryl, or heterocyclic; and n is either 1, 2, or 3; provided that when M is a Group 6 metal, n is 3.

26. The catalyst of claim 25, wherein the metal is a Group 4 metal.

27. The catalyst of claim 26, wherein the metal is selected from the group consisting of: titanium and zirconium.

28. The catalyst of claim 25, wherein the metal is a Group 5 metal.

29. The catalyst of claim 28, wherein the metal is selected from the group consisting of: vanadium, tantalum and niobium.

30. The catalyst of claim 25, wherein the metal is a Group 6 metal.

31. The catalyst of claim 28, wherein the metal is selected from the group consisting of: chromium, tungsten and molybdenum.

32. A constrained geometry catalyst comprising a compound of claim 1.

33. A catalyst of claim 32, comprising: i) an activator; and ii) an organometallic complex comprising a Group 4, Group 5 or Group 6 metal, M, wherein the compound is $\eta^5$ bonded to M.

34. A method to make a constrained geometry catalyst (CGC) comprising coordinating a triply deprotonated compound of claim 1 with at least one metal.

35. A constrained geometry catalyst produced by the method of claim 34.

36. A method for making a supported catalyst for a polymerization process, comprising:
a.) providing a catalyst comprising: a triply deprotonated compound of claim 1 complexed with a metal;
b.) mixing the catalyst with an activator, an inert support, and an unreactive hydrocarbon solvent; and
c.) removing the solvent to yield a supported catalyst.

37. The method of claim 36, wherein the metal comprises a Group 4-6 metal.

38. The method of claim 36, wherein the activator comprises one or more of: an aluminum alkyl, an organoboron reagent, an aluminoxane, a triphenyl carbenium, a dimethyl anilinium, or mixtures and salts thereof.

39. The method of claim 36, wherein the inert support comprises one or more of: silica, alumina, aluminophosphate, aluminosilicate, magnesia, titania, or mixtures thereof.

40. The method of claim 36, wherein the unreactive hydrocarbon solvent comprises at least one of toluene or hexane.

41. The method of claim 36, wherein the solvent is removed by vacuum distillation.

42. A method for making a supported catalyst, comprising:
a.) providing a catalyst comprising a compound of claim 1 and a metal, wherein one or more substituents on the compound includes at least one group that binds to an inert support surface;
b.) mixing the catalyst with an activator, the inert support, and an unreactive hydrocarbon solvent; and
c.) removing the solvent to yield the supported catalyst.

43. The method of claim 42, wherein the metal complex is covalently attached to the inert support by reaction of surface hydroxyl groups with a Si—OEt group and by formation of support O—Si linkages and ethanol.

44. A method of ring-opening polymerization comprising:
(i) binding a compound of claim 1 and at least one additional ligand to a metal;
(ii) inserting an epoxide, lactone, lactide, lactam, or cyclic ether into the bond between the metal and the additional ligand, thereby opening a ring; and
(iii) repeating step (ii) to form a polymer.

45. A method to hydroaminate at least one chemical, comprising:
coordinating a compound of claim 1 to at least one metal to form a constrained geometry catalyst; and
reacting an alkene or alkyne with an amine in the presence of the constrained geometry catalyst to form an amine.

46. A method to achieve a metathesis of at least one chemical, comprising:
synthesizing an alkylidene complex of a metal complex of claim 7;
reacting the alkylidene complex with a first alkene; and
reacting the alkylidene complex with a second alkene to achieve a metathesis of at least one chemical.

47. A method to achieve a metathesis of at least one chemical, comprising catalytically reacting a metal complex of claim 7 with substituted alkenes in a metathesis process.

48. A method to achieve a metathesis of at least one chemical, comprising:
synthesizing an alkylidyne complex of a metal complex of claim 7;
reacting the alkylidyne complex with a first alkyne; and
reacting the alkylidyne complex with a second alkyne to achieve a metathesis.

49. A method of hydroamination comprising:
synthesizing an imido complex of a metal complex of claim 7; and
reacting an alkene with an amine in the presence of the imido complex to form a new amine.

50. A method to make at least one polymer, comprising:
(i) abstracting a methide ion from a constrained geometry catalyst of claim 35 to form a cation;
(ii) coordinating at least one alkene or alkyne to the constrained geometry catalyst;
(iii) inserting the alkene or alkyne in the presence of a weakly coordinating anion; and
(iv) repeating steps (ii)-(iii) to make at least one polymer.

51. A compound selected from the group consisting of Formula 1-4

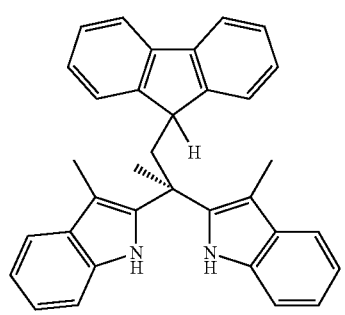

1

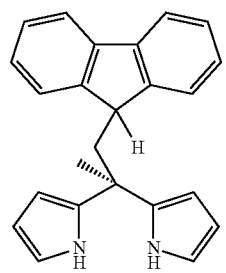

2

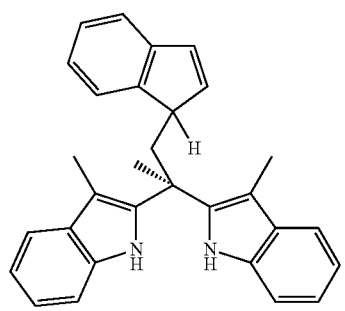

3

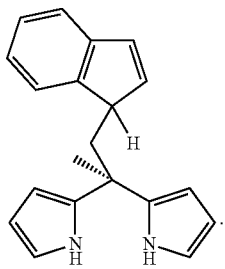

4

52. A method to make a polymer, comprising:
(i) triply deprotonating a compound of claim 51;
(ii) coordinating the triply deprotonated compound to at least one metal to form a constrained geometry catalyst;
(iii) abstracting a methide ion from the constrained geometry catalyst to form a cation;
(iv) coordinating at least one alkene or alkyne to the constrained geometry catalyst;
(v) inserting the alkene or alkyne in the presence of a weakly coordinating anion; and
(vi) repeating steps (iv)-(v) to make a polymer.

53. A method to hydroaminate at least one chemical, comprising:
deprotonating a compound of claim 51 and coordinating it to at least one metal to form a constrained geometry catalyst; and
using the constrained geometry catalyst to catalyze a hydroamination process.

54. A method for making a trianionic ligand precursor compound, comprising:
reacting fluorene with n-butyllithium and bromoacetaldehyde diethylacetal to form fluoroenylacetaldehyde diethylacetal; and
reacting the fluorenylacetaldehyde diethylacetal with a pyrrole or an indole in the presence of an acid catalyst to yield a trianionic ligand precursor compound.

55. The method of claim 54, wherein the indole is 3-methylindole and the catalyst is concentrated sulfuric acid.

56. The method of claim 54, wherein the pyrrole is pyrrole and the catalyst is zirconium (IV) chloride.

57. A method for making a trianionic ligand precursor compound, comprising:
reacting indene with n-butyllithium and bromoacetaldehyde diethylacetal to form indenyl acetaldehyde diethylacetal; and
reacting the indenyl acetaldehyde diethylacetal with a pyrrole or an indole in the presence of an acid catalyst to yield a trianionic ligand precursor compound.

58. The method of claim 57, wherein the indole is 3-methylindole.

59. The method of claim 57, wherein the pyrrole is pyrrole.

* * * * *